US010942024B2

(12) United States Patent
Tsurumi

(10) Patent No.: US 10,942,024 B2
(45) Date of Patent: Mar. 9, 2021

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 68 days.

(21) Appl. No.: 16/072,038

(22) PCT Filed: Nov. 4, 2016

(86) PCT No.: PCT/JP2016/082841
§ 371 (c)(1),
(2) Date: Jul. 23, 2018

(87) PCT Pub. No.: WO2017/134886
PCT Pub. Date: Aug. 10, 2017

(65) Prior Publication Data
US 2019/0033058 A1 Jan. 31, 2019

(30) Foreign Application Priority Data
Feb. 2, 2016 (JP) .............................. JP2016-017623

(51) Int. Cl.
*G06K 9/00* (2006.01)
*G01B 11/02* (2006.01)
(Continued)

(52) U.S. Cl.
CPC ............ *G01B 11/02* (2013.01); *G01B 11/002* (2013.01); *G02B 27/0172* (2013.01);
(Continued)

(58) Field of Classification Search
None
See application file for complete search history.

(56) References Cited

U.S. PATENT DOCUMENTS 9,372,621 B2 * 6/2016 Wu ...................... G06F 3/0484
10,114,545 B2 * 10/2018 Middleton ................ G06T 7/11
(Continued)

FOREIGN PATENT DOCUMENTS

EP        2546806 A2    1/2013
JP      H06-241754 A    9/1994
(Continued)

OTHER PUBLICATIONS

AR experience by the first smartphone "Lenovo PHAB 2 Pro" equipped with Google's space recognition technology "Tango" will look like this (translated), http://gigazine.net/news/20160630-snapdragon-tango-ar/, Jun. 30, 2016.
(Continued)

*Primary Examiner* — Soo Jin Park
(74) *Attorney, Agent, or Firm* — Paratus Law Group, PLLC

(57) ABSTRACT

There is provided an information processing apparatus to measure a distance in a real space with a simpler operation, the information processing apparatus including: an acquisition section that acquires an image captured by a predetermined imaging section, and position information based on at least any of a position and a direction of the imaging section; an estimation section that estimates a first position and a second position in a real space, on a basis of a first image and a second image which are the image captured at each of a first viewpoint and a second viewpoint, and first position information and second position information which are the position information about each of the first viewpoint and the second viewpoint; and a measurement section that measures a distance between the first position and the second position on a basis of the estimation result.

15 Claims, 22 Drawing Sheets

(51) Int. Cl.
  *G06F 3/0346* (2013.01)
  *G06T 19/00* (2011.01)
  *G06F 3/01* (2006.01)
  *G06F 3/03* (2006.01)
  *G01B 11/00* (2006.01)
  *G02B 27/01* (2006.01)

(52) U.S. Cl.
  CPC ............ *G06F 3/013* (2013.01); *G06F 3/0304* (2013.01); *G06F 3/0346* (2013.01); *G06T 19/00* (2013.01); *G06T 19/006* (2013.01); *G02B 2027/0178* (2013.01)

(56) References Cited

U.S. PATENT DOCUMENTS

| | | | | |
|---|---|---|---|---|
| 10,238,463 | B2* | 3/2019 | Verstege | A61B 90/37 |
| 2013/0050070 | A1* | 2/2013 | Lewis | A61B 3/113 |
| | | | | 345/156 |
| 2013/0201210 | A1* | 8/2013 | Vaddadi | G06T 19/006 |
| | | | | 345/632 |
| 2014/0201023 | A1* | 7/2014 | Tang | G06Q 30/0643 |
| | | | | 705/26.5 |
| 2015/0066427 | A1* | 3/2015 | Vaddadi | G01S 15/08 |
| | | | | 702/151 |
| 2015/0130839 | A1 | 5/2015 | Kasahara et al. | |
| 2016/0147408 | A1* | 5/2016 | Bevis | G02B 27/017 |
| | | | | 715/850 |

FOREIGN PATENT DOCUMENTS

| | | |
|---|---|---|
| JP | 2000-152125 A | 5/2000 |
| JP | 2013-092964 A | 5/2013 |
| JP | 2015-510112 A | 4/2015 |
| JP | 2015-510113 A | 4/2015 |
| WO | WO 2013/106290 A1 | 7/2013 |
| WO | WO 2013/106291 A1 | 7/2013 |

OTHER PUBLICATIONS

Knorr et al., Leveraging the User's Face for Absolute Scale Estimation in Handheld Monocular SLAM, 2016 IEEE International Symposium on Mixed and Augmented Reality, Sep. 19-23, 2016. pp. 11-17, IEEE.

Jan. 3, 2019, European Search Report issued for related EP Application No. 16889369.1.

Mar. 2, 2020, Chinese Office Action issued for related CN Application No. 201680080201.4.

* cited by examiner

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2016/082841 (filed on Nov. 4, 2016) under 35 U.S.C. § 371, which claims priority to Japanese Patent Application No. 2016-017623 (filed on Feb. 2, 2016), which are all hereby incorporated by reference in their entirety.

TECHNICAL FIELD

The present disclosure relates to an information processing apparatus, an information processing method, and a recording medium.

BACKGROUND ART

Recently, as image recognition technology has become more advanced, it has become possible to recognize the position and attitude of a real object (that is, a body in a real space) included in an image captured by an imaging apparatus. The technology called augmented reality (AR) is known as one applied example of such body recognition. By utilizing AR technology, it becomes possible to present, to a user, virtual content (hereinafter also designated a "virtual object") in various modes such as text, icons, or animations, superimposed onto a real object captured in an image of a real space. For example, Patent Literature 1 discloses one example of AR technology.

Also, by an application of body recognition technology, it becomes possible to execute what is called localization for recognizing the position in real space of an imaging section (and by extension, the apparatus provided with the imaging section) that captures an image of an object. The technology called simultaneous localization and mapping (SLAM) is one example of technology for realizing such localization.

CITATION LIST

Patent Literature

Patent Literature 1: JP 2013-92964A

DISCLOSURE OF INVENTION

Technical Problem

On the other hand, there is demand for a mechanism making it possible to achieve the measurement of a distance in a real space by applying technologies such as AR and SLAM described above, with a simpler operation.

Accordingly, the present disclosure provides an information processing apparatus, an information processing method, and a recording medium capable of measuring a distance in a real space with a simpler operation.

Solution to Problem

According to the present disclosure, there is provided an information processing apparatus including: an acquisition section that acquires an image captured by a predetermined imaging section, and position information based on at least any of a position and a direction of the imaging section; an estimation section that estimates a first position and a second position in a real space, on a basis of a first image and a second image which are the image captured at each of a first viewpoint and a second viewpoint, and first position information and second position information which are the position information about each of the first viewpoint and the second viewpoint; and a measurement section that measures a distance between the first position and the second position on a basis of the estimation result.

In addition, according to the present disclosure, there is provided an information processing method including: acquiring an image captured by a predetermined imaging section, and position information based on at least any of a position and a direction of the imaging section; estimating, by a processor, a first position and a second position in a real space, on a basis of a first image and a second image which are the image captured at each of a first viewpoint and a second viewpoint, and first position information and second position information which are the position information about each of the first viewpoint and the second viewpoint; and measuring, by the processor, a distance between the first position and the second position on a basis of the estimation result.

In addition, according to the present disclosure, there is provided a recording medium storing a program causing a computer to execute: acquiring an image captured by a predetermined imaging section, and position information based on at least any of a position and a direction of the imaging section; estimating a first position and a second position in a real space, on a basis of a first image and a second image which are the image captured at each of a first viewpoint and a second viewpoint, and first position information and second position information which are the position information about each of the first viewpoint and the second viewpoint; and measuring a distance between the first position and the second position on a basis of the estimation result.

Advantageous Effects of Invention

According to the present disclosure as described above, there are provided an information processing apparatus, an information processing method, and a recording medium capable of measuring a distance in a real space with a simpler operation.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
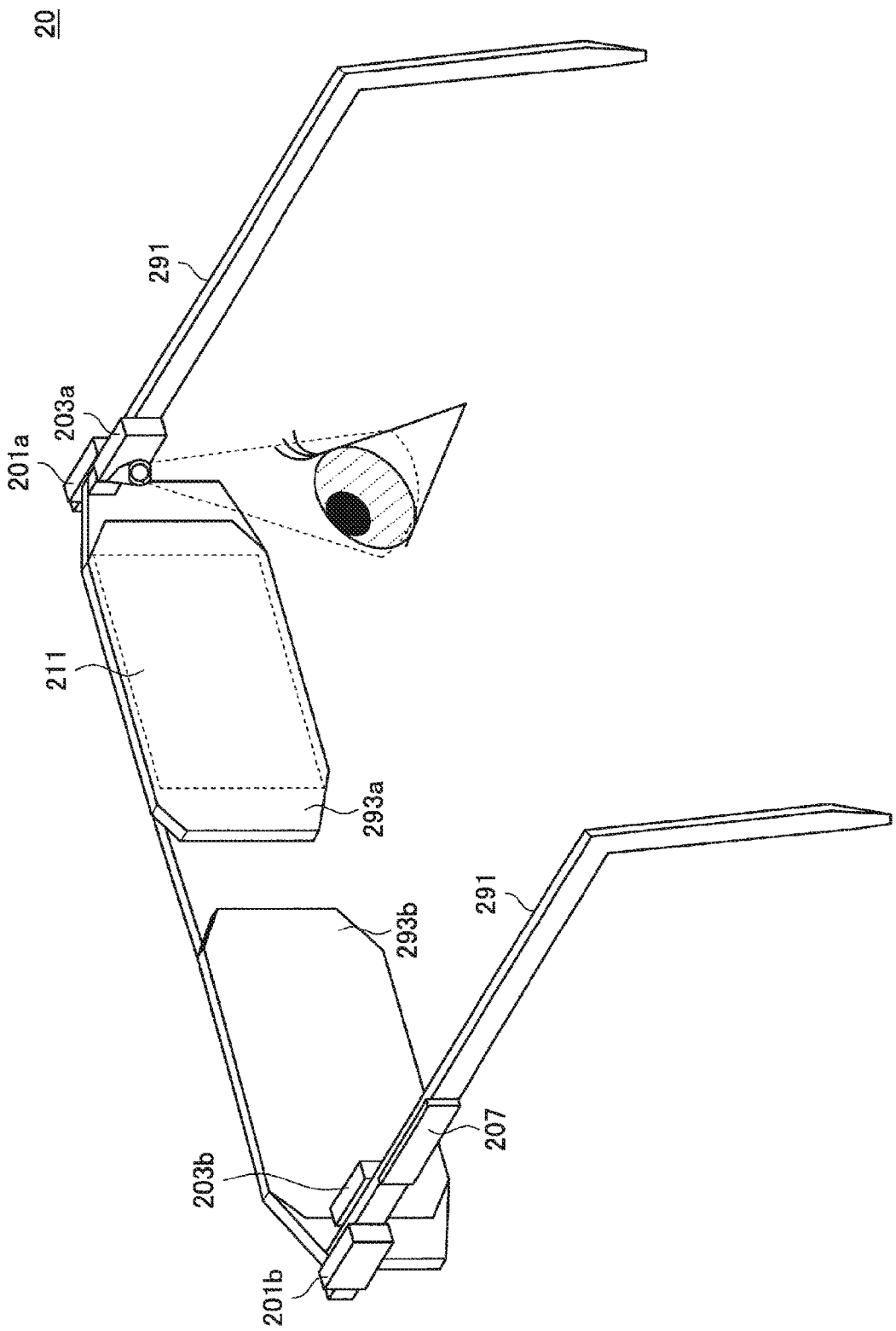
FIG. 1 is an explanatory diagram for explaining an example of a schematic configuration of an input/output apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.
1. Introduction
 1.1. Configuration of input/output apparatus
 1.2. Basic principle of localization
2. First Embodiment
 2.1. Measurement method
 2.2. Functional configuration
 2.3. Processes
 2.4. Evaluation
3. Second Embodiment
 3.1. Measurement method
 3.2. Processes
 3.3. Evaluation
4. Third Embodiment
 4.1. Measurement method
 4.2. Functional configuration
 4.3. Processes
 4.4. Evaluation
5. Fourth Embodiment
 5.1. Measurement method
 5.2. Functional configuration
 5.3. Processes
 5.4. Evaluation
6. Modifications
 6.1. Modification 1: Measurement of length of curve
 6.2. Modification 2: Example of measurement method based on operation of virtual object
 6.3. Modification 3: Example of case of linking multiple apparatus
7. Application examples
8. Exemplary hardware configuration
9. Conclusion 1. Introduction <1.1. Configuration of Input/Output Apparatus>

First, an example of a schematic configuration of an input/output apparatus according to an embodiment of the present disclosure will be described with reference to FIG. 1. FIG. 1 is an explanatory diagram for explaining an example of a schematic configuration of the input/output apparatus according to the present embodiment.

The input/output apparatus 20 is configured as what is called a head-mounted device, which is used by being worn on at least part of a user's head. For example, in the example illustrated in FIG. 1, the input/output apparatus 20 is configured as what is called an eyewear (glasses-style) device, in which at least one of lenses 293a and 293b is configured as a transmissive display (output section 211). Also, the input/output apparatus 20 is provided first imaging sections 201a and 201b, second imaging sections 203a and 203b, an operating section 207, and a holding section 291 that corresponds to the frames of the glasses. When the input/output apparatus 20 is worn on the user's head, the holding section 291 holds the output section 211, the first imaging sections 201a and 201b, the second imaging sections 203a and 203b, and the operating section 207 in a predetermined positional relationship with respect to the user's head. Additionally, although not illustrated in FIG. 1, the input/output apparatus 20 may also be provided with a sound collection section for collecting the user's voice.

Herein, a more specific configuration of the input/output apparatus 20 will be described. For example, in the example illustrated in FIG. 1, the lens 293a corresponds to the lens on the right-eye side, while the lens 293b corresponds to the lens on the left-eye side. In other words, in the case in which the input/output apparatus 20 is worn, the holding section 291 holds the output section 211 such that the output section 211 is positioned in front of the user's eyes.

The first imaging sections 201a and 201b are configured as what is called a stereo camera, with each being held by the holding section 291 to point in the direction that the user's head is facing (that is, the forward direction of the user) when the input/output apparatus 20 is worn on the user's head. At this time, the first imaging section 201a is held near the user's right eye, while the first imaging section 201b is held near the user's left-eye. On the basis of such a configuration, the first imaging sections 201a and 201b capture a subject (in other words, a real object positioned in a real space) positioned in front of the input/output apparatus 20 from mutually different positions. With this arrangement, the input/output apparatus 20 becomes able to acquire images of the subject positioned in front of the user, and in addition, on the basis of the parallax between the images captured by each of the first imaging sections 201a and 201b, compute the distance from the input/output apparatus 20 to the subject.

In addition, each of the second imaging sections 203a and 203b is held by the holding section 291 so an eyeball of the user is positioned inside the imaging range of each when the input/output apparatus 20 is worn on the user's head. As a specific example, the second imaging section 203a is held such that the user's right eye is positioned inside the imaging range. On the basis of such a configuration, it becomes possible to recognize the direction in which the line of sight of the right eye is pointing, on the basis of the image of the eyeball of the right eye captured by the second imaging section 203a, and the positional relationship between the second imaging section 203a and the right eye. Similarly, the second imaging section 203b is held such that the user's left eye is positioned inside the imaging range. In other words, it becomes possible to recognize the direction in which the line of sight of the left eye is pointing, on the basis of the image of the eyeball of the left eye captured by the second imaging section 203b, and the positional relationship between the second imaging section 203b and the left eye. Note that in the following description, the direction in which the line of sight is pointing will also be designated the "line-of-sight direction". Also, although the example illustrated in FIG. 1 illustrates a configuration in which the input/output apparatus 20 includes both second imaging sections 203a and 203b, it is also possible to provide only one of the second imaging sections 203a and 203b.

The operating section 207 is a configuration for receiving operations from the user with respect to the input/output apparatus 20. For example, the operating section 207 may be configured by an input device like a touch panel, a button, or the like. The operating section 207 is held by the holding section 291 at a predetermined position on the input/output apparatus 20. For example, in the example illustrated in FIG. 1, the operating section 207 is held at a position corresponding to a temple of the glasses.

In addition, the input/output apparatus 20 according to the present embodiment may also be provided with an acceleration sensor and an angular velocity sensor (gyro sensor), for example, and be configured to be able to detect the motion of the head of the user wearing the input/output apparatus 20 (in other words, the motion of the input/output apparatus 20 itself). As a specific example, the input/output apparatus 20 may detect the component in each of the yaw direction, pitch direction, and roll direction as the motion of the users head, and thereby recognize a change in at least of the position and the attitude of the user's head.

On the basis of a configuration like the above, the input/output apparatus 20 according to the present embodiment becomes able to recognize changes in the position and attitude of itself in the real space corresponding to the motion of the user's head. Additionally, the input/output apparatus 20 also becomes able to present content on the output section 211 on the basis of what is called AR technology, such that virtual content (that is, a virtual object) is superimposed onto a real object positioned in the real space. Note that an example of a method by which the input/output apparatus 20 estimates the position and the attitude of itself (that is, localization) will be described separately in detail.

Note that examples of the head-mounted display (HMD) applicable as the input/output apparatus 20 include a see-through HMD, a video see-through HMD, and a retinal projection HMD, for example.

A see-through HMD, for example, uses a half mirror and a transparent light guide plate to hold a virtual image optical system including a transparent light guide unit and the like in front of the user's eyes, and display an image on the inner side of the virtual image optical system. For this reason, for the user wearing the see-through HMD, it is possible for the outside scene to enter into one's field of view, even while viewing the image displayed on the inner side of the virtual image optical system. According to such a configuration, on the basis of AR technology, for example, the see-through HMD is capable of superimposing an image of the virtual object onto an optical image of the real object positioned in the real space, in accordance with a recognition result of at least one of the position and the attitude of the see-through HMD. Note that specific examples of the see-through HMD include what is called a glasses-style wearable device, in which the part corresponding to the lenses of a pair of glasses are configured as the virtual image optical system. For example, the input/output apparatus 20 illustrated in FIG. 1 corresponds to an example of a see-through HMD.

In the case in which a video see-through HMD is worn on the user's head or face, the video see-through HMD is worn to cover the user's eyes, and a display unit such as a display is held in front of the user's eyes. Further, the video see-through HMD includes an imaging unit for imaging the surrounding scene, and causes the display unit to display an image of the scene in front of the user imaged by the imaging unit. With such a configuration, for the user wearing the video see-through HMD, it is difficult for the outside scene to enter into one's field of view directly, but it becomes possible to check the outside scene by an image displayed on the display unit. In addition, on the basis of AR technology, for example, the video see-through HMD at this time may also superimpose a virtual object onto an image of the external scenery, in accordance with a recognition result of at least one of the position and the attitude of the video see-through HMD.

With a retinal projection HMD, a projection unit is held in front of the user's eyes, and an image is projected from the projection unit towards the user's eyes so that the image is superimposed onto the outside scene. More specifically, in a retinal projection HMD, an image is projected directly from the projection unit onto the retina of the user's eyes, and the image is formed on the retina. With such a configuration, the viewing of a clearer picture becomes possible, even in the case of a near-sighted or a far-sighted user. Also, for the user wearing the retinal projection HMD, it becomes possible for the outside scene to enter into one's field of view, even while viewing the image projected from the projection unit. According to such a configuration, on the basis of AR technology, for example, the retinal projection HMD is capable of superimposing an image of the virtual object onto an optical image of the real object positioned in the real space, in accordance with a recognition result of at least one of the position and the attitude of the retinal projection HMD.

Note that for reference, besides the examples described above, an HMD called an immersive HMD is also possible. The immersive HMD is worn to cover the user's eyes, similarly to the video see-through HMD, and a display unit such as a display is held in front of the user's eyes. For this reason, for the user wearing the immersive HMD, it is difficult for the outside scene (that is, the scene of the real world) to enter into one's field of view directly, and only the picture displayed on the display unit enters one's field of view. With such a configuration, the immersive HMD is capable of imparting a sense of immersion to the user viewing an image.

The above describes an example of the schematic configuration of the input/output apparatus according to the embodiment of the present disclosure with reference to FIG. 1.

<1.2. Principle of Localization>

Next, when the input/output apparatus 20 superimposes a virtual object onto a real object, an example of the principle of the technique for estimating the position and attitude of itself in a real space (that is, localization) will be described.

As a specific example of localization, the input/output apparatus 20 uses an imaging section, such as a camera provided on itself, to capture a marker or the like of known size presented on a real object in the real space. Additionally, by analyzing the captured image, the input/output apparatus 20 estimates at least one of the relative position and attitude of oneself with respect to the marker (and by extension, the real object on which the marker is presented). Note that the following description focuses on a case in which the input/output apparatus 20 estimates the position and the attitude of itself, but the input/output apparatus 20 may also estimate at least one of the position and attitude of itself.

Specifically, it is possible to estimate the relative direction of the imaging section (and by extension, the input/output apparatus 20 in which the imaging section is provided) with respect to the marker, in accordance with the direction of the marker (for example, the direction of a pattern or the like of the marker) captured in the image. Also, in the case in which the size of the marker is known, it is possible to estimate the distance between the marker and the imaging section (that is, the input/output apparatus 20 in which the imaging section is provided), in accordance with the size of the marker in the image. More specifically, if the marker V10 is captured from farther away, the marker is captured smaller. Also, the range of the real space captured in the image at this time can be estimated on the basis of the angle of view of the imaging section. By utilizing the above characteristics, it is possible to back-calculate the distance between the marker and the imaging section in accordance with the size of the marker captured in the image (in other words, the proportion of the angle of view occupied by the marker). According to a configuration like the above, the input/output apparatus 20 becomes able to estimate the relative position and attitude of itself with respect to the marker.

In addition, the technology named simultaneous localization and mapping (SLAM) may also be utilized for localization of the input/output apparatus 20. SLAM refers to a technology that executes localization and the creation of an environment map in parallel by utilizing an imaging section such as a camera, various sensors, an encoder, and the like. As a more specific example, with SLAM (particularly visual SLAM), the three-dimensional shape of a captured scene (or subject) is successively reconstructed on the basis of a moving image captured by the imaging section. Additionally, by associating the reconstruction result of the captured scene with a detection result of the position and attitude of the imaging section, the creation of a map of the surrounding environment and the estimation of the position and attitude of the imaging section (and by extension, the input/output apparatus 20). Note that, for example, by providing the input/output apparatus 20 with various sensors, such as an acceleration sensor and an angular velocity sensor, it is possible to estimate the position and the attitude of the imaging section as information indicating relative change on the basis of the detection results of the sensors. Obviously, as long as the position and the attitude of the imaging section can be estimated, the method is not necessarily limited only to a method based on the detection results of various sensors such as an acceleration sensor and an angular velocity sensor.

Based on a configuration like the above, for example, estimation results for the relative position and attitude of the input/output apparatus 20 with respect to the known marker based on an imaging result of marker by the imaging section may also be utilized in an initialization process and position correction in SLAM described above. According to such a configuration, even under circumstances in which the marker is not included inside the angle of view of the imaging section, by localization based on SLAM receiving the results of previously executed initialization and position correction, the input/output apparatus 20 is able to estimate the position and attitude of oneself with respect to the marker (and by extension, the real object on which the marker is presented).

When the input/output apparatus 20 superimposes a virtual object onto a real object, an example of the principle of the technique for estimating the position and attitude of itself in a real space (that is, localization) has been described. Note that in the following, the position and the attitude of the input/output apparatus 20 with respect to a body (real object) in the real space will be described as being possible to estimate on the basis of the basic principle described above, for example.

2. First Embodiment

Next, an example of an information processing system according to the first embodiment of the present disclosure will be described. The information processing system according to the present embodiment, by applying the technologies of AR and localization (such as SLAM) described earlier, is capable of measuring the distance between multiple positions in a real space, on the basis of an operation through the input/output apparatus 20. Accordingly, in the following, for the information processing system according to the present embodiment, each of a distance measurement method using the system, the configuration of the system, and processes of the system will be described.

<2.1. Measurement Method>

Figure 2:
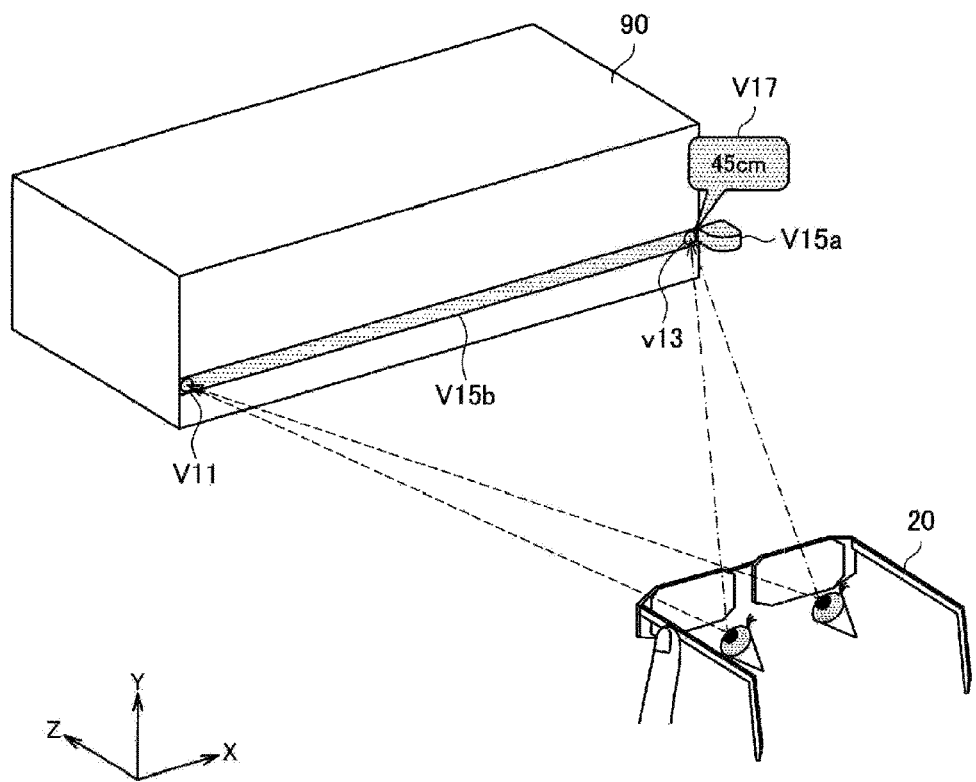
FIG. 2 is an overview of an information processing system according to a first embodiment of the present disclosure.
Figure 3:
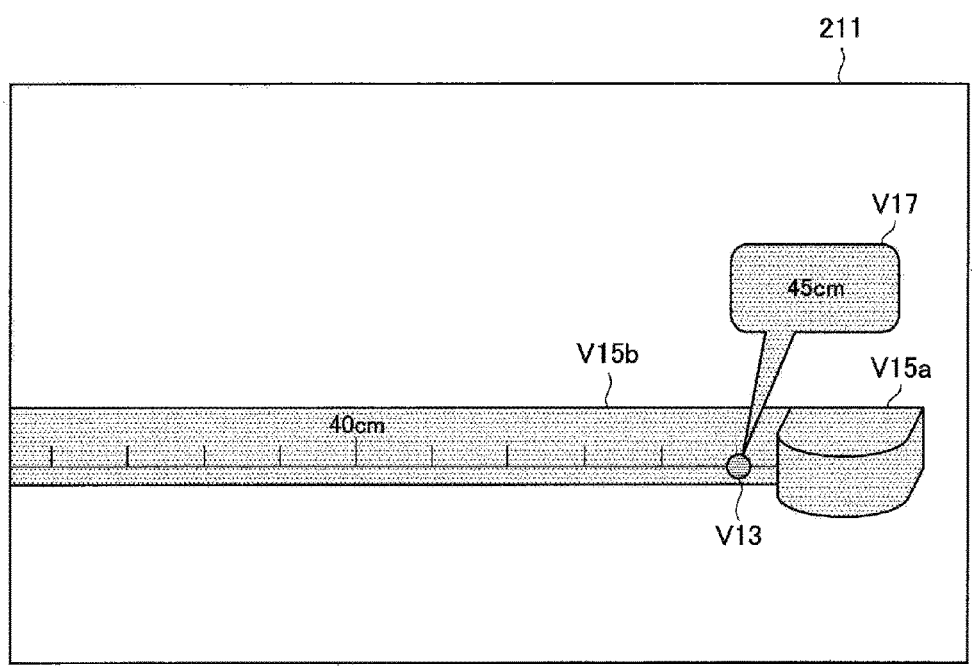
FIG. 3 illustrates an example of display information presented according to a distance measurement result.

First, FIGS. 2 and 3 will be referenced to describe an example of a method of measuring distance in a real space using the information processing system according to the present embodiment. For example, FIG. 2 is an explanatory diagram for explaining an overview of the information processing system according to the present embodiment, and illustrates an example of a method of measuring distance in a real space. Note that in FIG. 2, to make the features of the information processing system according to the present embodiment easier to understand, both a real object and a virtual object are presented together.

In the information processing system according to the present embodiment, the user first puts on the input/output apparatus 20, and specifies a start point and an end point of the measurement of a distance in the real space by line of sight. At this time, on the basis of a measurement result of the distance between the input/output apparatus 20 and a real object 90, and a recognition result of the user's line of sight, the system estimates the three-dimensional positions of the start point and the end point specified on the real object 90. More specifically, the system recognizes the intersection point between a mesh surface based on a measurement result of the distance (depth) between the input/output apparatus 20 and the real object 90, and a vector expressing the line-of-sight direction (hereinafter also designated the "line-of-sight vector"), as a point (that is, the start point or the end point) on the real object specified by the user.

As a specific procedure, first, the user puts on the input/output apparatus 20, and performs a predetermined operation (for example, an operation on the operating section 207) for registration of the start point while gazing at a position on the real object 90 to set as the start point of the measurement of distance. Receiving the operation, the system estimates the three-dimensional position in the real space that the user is gazing at, and registers the estimated position as the start point. Additionally, at this time, the system may present a virtual object V11 indicating the start point to the user through the input/output apparatus 20 (for example, the output section 211), such that the virtual object V11 is superimposed onto the position in the real space registered as the start point.

After the registration of the start point is completed, the user performs a predetermined operation for registration of the end point while gazing at a position on the real object 90 to set as the end point of the measurement of distance. Receiving the operation, the system executes registration of the end point, similarly to the case of the start point. Additionally, at this time, the system may present a virtual object V13 indicating the end point to the user through the input/output apparatus 20, such that the virtual object V13 is superimposed onto the position in the real space registered as the end point.

Additionally, on the basis of the estimation result of the three-dimensional position of each of the registered start point and end point, the system measures (computes) the distance between the start point and the end point, and presents display information V17 indicating the measurement result to the user through the input/output apparatus 20 (for example, the output section 211). For example, FIG. 3 illustrates an example of the display information presented according to the distance measurement result. According to such a configuration, the user becomes able to measure distance in the real space by a simpler operation using the input/output apparatus 20, without measuring the distance by actually using a tool such as a ruler or a tape measure.

In addition, at this time, the system may also present display information indicating the scale (dimensions) in the real space. For example, in the example illustrated in FIGS. 2 and 3, after the registration of the start point, the system presents virtual objects V15a and V15b shaped like a tape measure between the start point and the position where the user's line of sight is pointed, in accordance with the movement of the user's line of sight. Specifically, by presenting the virtual object V15a corresponding to the case of the tape measure, the system indicates the position in the real space where the user's line of sight is pointed. Also, between the registered start point and virtual object V15a, the system presents the virtual object V15b, which is band-shaped and denoted with scale marks in accordance with the dimensions in the real space. According to such control, the user becomes able to measure a distance in the real space by an operation through the input/output apparatus 20, with a feeling similar to the case of actually measuring the distance using a tool such as a ruler or a tape measure. Note that in the following description, the position where the user's line of sight is pointed is designated the "gaze point", and the position acting as the base point of the line of sight (for example, the position corresponding to the eyes, or in other words, the position of the input/output apparatus 20) is designated the "viewpoint" in some cases.

The above references FIGS. 2 and 3 to describe an example of a method of measuring distance in a real space using the information processing system according to the present embodiment.

<2.2. Functional Configuration>

Figure 4:
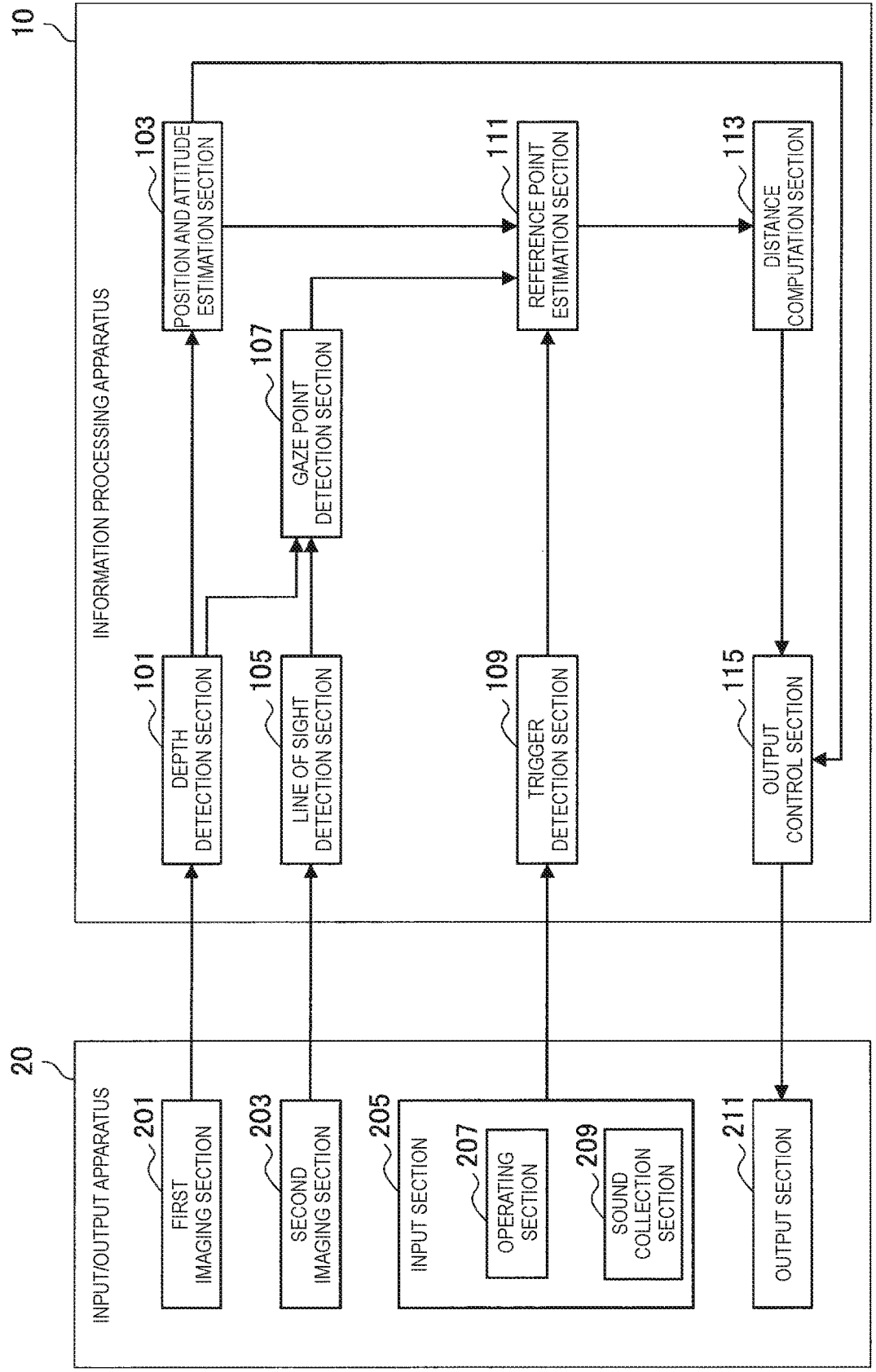
FIG. 4 is a block diagram illustrating an example of a functional configuration of the information processing system according to the embodiment.

Next, FIG. 4 will be referenced to describe an example of the functional configuration of the information processing system according to the present embodiment. FIG. 4 is a block diagram illustrating an example of the functional configuration of the information processing system according to the present embodiment.

As illustrated in FIG. 4, the information processing system 1 according to the present embodiment includes an input/output apparatus 20 and an information processing apparatus 10, for example. Note that the input/output apparatus 20 corresponds to the input/output apparatus 20 described with reference to FIG. 1.

First, the description will focus on the configuration of the input/output apparatus 20. As illustrated in FIG. 4, the input/output apparatus 20 includes a first imaging section 201, a second imaging section 203, an input section 205, and an output section 211. In addition, the input section 205 includes an operating section 207. In addition, the input section 205 may include a sound collection section 209. Note that the first imaging section 201 corresponds to the first imaging sections 201a and 201b illustrated in FIG. 1. Also, the second imaging section 203 corresponds to the second imaging sections 203a and 203b illustrated in FIG. 1. Also, the operating section 207 and the output section 211 respectively correspond to the operating section 207 and the output section 211 illustrated in FIG. 1.

The first imaging section 201 is configured as what is called a stereo camera and captures images of a subject from multiple different positions, or in other words, an image of the subject from a viewpoint corresponding to the right-eye side, and an image of the subject from a viewpoint corresponding to the left-eye side. Note that in the following description, the image captured from the viewpoint corresponding to the right-eye side is also designated the "right-eye image", and the image captured from the viewpoint corresponding to the left-eye side is also designated the "left-eye image". Subsequently, the first imaging section 201 outputs the captured right-eye image and left-eye image to the information processing apparatus 10.

The second imaging section 203 captures an image of the eyeball of the user wearing the input/output apparatus 20, and outputs the captured image to the information processing apparatus 10. Note that at this time, the second imaging section 203 may capture an image of the eyeball of each of the user's right and left eyes, and output each image to the information processing apparatus 10.

In the case of receiving an operation from the user, the operating section 207 outputs control information indicating the content of the operation to the information processing apparatus 10. Also, the sound collection section 209 collects sound such as the user's voice, and outputs a sound signal based on the sound collection result of such sound to the information processing apparatus 10.

The output section 211 is configured as what is called a display or the like, and displays display information, such as images and the like, on the basis of control from the information processing apparatus 10. For example, as described earlier with reference to FIG. 1, the output section 211 may be configured as what is called a transmissive display.

Next, the description will focus on the configuration of the information processing apparatus 10. As illustrated in FIG. 4, the information processing apparatus 10 includes a depth detection section 101, a position and attitude estimation section 103, a line of sight detection section 105, a gaze point detection section 107, a trigger detection section 109, a reference point estimation section 111, a distance computation section 113, and an output control section 115.

The depth detection section 101 acquires, from the first imaging section 201, the right-eye image and the left-eye image captured by the first imaging section 201. On the basis of the parallax between the right-eye image and the left-eye image, the depth detection section 101 computes the distance (that is, the depth) between the input/output apparatus 20 and the subject captured in the right-eye image and the left-eye image. Subsequently, the depth detection section 101 outputs the acquired images of the subject (for example, the right-eye image and the left-eye image) and depth information indicating the computed depth (for example, information indicating a mesh surface based on the depth measurement result) to the position and attitude estimation section 103. In addition, the depth detection section 101 outputs the depth information to the gaze point detection section 107.

The position and attitude estimation section 103 is a configuration for executing a process related to the estimation of the position and the attitude of the input/output apparatus 20 in the real space (a process related to what is called localization).

Specifically, the position and attitude estimation section 103 acquires the images of the subject and the depth information from the depth detection section 101. The position and attitude estimation section 103, by performing analysis processing on each acquired image, recognizes a body (real object) captured as the subject in the image. At this time, the position and attitude estimation section 103 may compute feature quantities on the basis of features (for example, features such as the shape and pattern) of the body captured in the images, for example, cross-reference with information indicating the feature quantities of known bodies, and thereby recognize the body captured in the image.

Next, the position and attitude estimation section 103 estimates the relative position and attitude of the input/output apparatus 20 with respect to the real object, on the basis of the recognition result of the real object captured in the acquired image, and the acquired depth information (that is, the information indicating the distance between the input/output apparatus 20 and the real object). Note that at this time, the position and attitude estimation section 103 may also estimate the relative position and attitude of the input/output apparatus 20 with respect to the recognized real object on the basis of SLAM. In this case, the position and attitude estimation section 103 may acquire information indicating changes in the position and the attitude of the input/output apparatus 20 from a predetermined detection section which is not illustrated (such as an acceleration sensor and an angular velocity sensor provided in the input/output apparatus 20, for example), and use the information for localization (that is, estimation of the position and the attitude of the input/output apparatus 20 with respect to the real object) based on SLAM.

Subsequently, the position and attitude estimation section 103 outputs information indicating the estimation result of the position and the attitude of the input/output apparatus 20 in the real space to the reference point estimation section 111. Additionally, the position and attitude estimation section 103 outputs information indicating the recognition result of the real object and information indicating the estimation result of the position and the attitude of the input/output apparatus 20 in the real space to the output control section 115.

The line of sight detection section 105 acquires, from the second imaging section 203, an image of the user's eyeball captured by the second imaging section 203. The line of sight detection section 105, by performing analysis processing on the acquired image, recognizes the direction in which the eyeball captured in the image is facing. On the basis of the recognition result of the direction in which the eyeball captured in the image is facing, and the positional relationship between the eyeball of the second imaging section 203, the line of sight detection section 105 detects the direction in which the eyeball is facing in the real space, that is, the line-of-sight direction. Note that obviously it is possible to recognize or estimate the positional relationship between the eyeball and the second imaging section 203 in advance, on the basis of the anticipated wear state of the input/output apparatus 20. In addition, the line-of-sight direction detected at this time corresponds to a relative direction based on the position and the attitude of the input/output apparatus 20. Subsequently, the line of sight detection section 105 outputs line-of-sight information indicating the detection result of the line-of-sight direction to the gaze point detection section 107.

The gaze point detection section 107 acquires the depth information indicating the depth detection result from the depth detection section 101. Also, the gaze point detection section 107 acquires the line-of-sight information indicating the line of sight detection result from the line of sight detection section 105. Additionally, on the basis of the acquired depth information and line-of-sight information, the gaze point detection section 107 detects the position in the real space at which the user's line of sight is pointing (that is, the position in the real space of the gaze point) as a relative position based on the position and the attitude of the input/output apparatus 20.

Specifically, the gaze point detection section 107 detects a line-of-sight vector on the basis of the line-of-sight information, and detects the intersection point between the line-of-sight vector and a mesh surface based on the depth information (that is, three-dimensional position information about the surface of the real object) as the position in the real space of the gaze point. Note that, as described earlier, the position detected at this time is a relative position based on the position and the attitude of the input/output apparatus 20. Subsequently, the gaze point detection section 107 outputs the detected position, that is, information indicating the position in the real space of the gaze point (hereinafter also designated the "gaze point position information") to the reference point estimation section 111.

The trigger detection section 109 acquires, from the input section 205, information indicating user input through the input section 205. Additionally, in the case in which the acquired information indicating user input indicates predetermined operation content, the trigger detection section 109 treats the user input as a trigger, and issues an instruction associated with the operation content to the reference point estimation section 111. As a specific example, in the case in which the acquired information indicating user input indicates the registration of a position in the real space to act as a reference in the measurement of distance (hereinafter also designated a "reference point"), like the start point and end point described earlier or the like, the trigger detection section 109 treats the user input as a trigger, and instructs the reference point estimation section 111 to register the reference point.

As a specific example, the trigger detection section 109 acquires control information indicating operation content from the operating section 207, and in the case in which the control information indicates an operation for registering a reference point, the trigger detection section 109 treats the operation as a trigger, and instructs the reference point estimation section 111 to register the reference point.

Also, as another example, the trigger detection section 109 may also acquire a sound signal based on a sound collection result from the sound collection section 209. In this case, the trigger detection section 109 recognizes content spoken by the user by performing various types of analysis processing based on what is called speech recognition processing and natural language processing on the acquired sound signal. Additionally, in the case in which the content spoken by the user indicates the registration of a reference point, the trigger detection section 109 may treat the recognition result of the spoken content as a trigger, and instruct the reference point estimation section 111 to register the reference point.

The reference point estimation section 111 acquires, from the position and attitude estimation section 103, information indicating the estimation result of the position and the attitude of the input/output apparatus 20 in the real space. Also, the reference point estimation section 111 acquires gaze point position information from the gaze point detection section 107. Additionally, in the case of receiving an instruction related to the registration of a reference point from the trigger detection section 109, the reference point estimation section 111 estimates the position in the real space of a reference point, such as a start point, end point, or the like, on the basis of the estimation result of the position and the attitude of the input/output apparatus 20, and the gaze point position information.

Specifically, on the basis of the gaze point position information acquired from the gaze point detection section 107, the reference point estimation section 111 recognizes the three-dimensional position in the real space of the gaze point as a relative position based on the position and the attitude of the input/output apparatus 20. Also, the reference point estimation section 111 recognizes the position and the attitude of the input/output apparatus 20 in the real space on the basis of information acquired from the position and attitude estimation section 103. With this arrangement, the reference point estimation section 111 becomes able to estimate the three-dimensional position in the real space of the gaze point as an absolute position, for example.

In addition, the reference point estimation section 111 registers a reference point, such as a start point, end point, or the like, on the basis of an instruction related to the registration of a reference point from the trigger detection section 109. For example, in the case of receiving an instruction related to the registration of a reference point, the reference point estimation section 111 may register a start point or an end point, depending on the reference point registration conditions. More specifically, in the case in which a start point has not been registered when the instruction is received, the reference point estimation section 111 registers the reference point estimated at that time (that is, the position in the real space of a gaze point) as the start point. Also, in the case in which a start point has been registered when the instruction is received, the reference point estimation section 111 may register the reference point estimated at that time as the end point.

Also, as another example, the reference point estimation section 111 may also receive registration-related instructions individually for each of the start point and the end point from the trigger detection section 109. For example, in the case of the recognizing that the registration of the start point is indicated by the user on the basis of an instruction from the trigger detection section 109, the reference point estimation section 111 registers the reference point estimated at that time as the start point. Similarly, in the case of recognizing that the registration of the end point is indicated by the user on the basis of an instruction from the trigger detection section 109, the reference point estimation section 111 may register the reference point estimated at that time as the end point.

As above, the reference point estimation section 111 registers reference points, such as a start point, end point, or the like, on the basis of instructions from the trigger detection section 109, and outputs position information indicating the position in the real space of each registered reference point to the distance computation section 113. With this arrangement, the distance computation section 113 becomes able to recognize the position in the real space of each registered reference point.

Additionally, the reference point estimation section 111 may also successively output information indicating the position in the real space of a gaze point to the distance computation section 113. With this arrangement, the distance computation section 113 becomes able to recognize in real-time the position in the real space in which the user's line of sight is pointed (that is, the position in the real space of the gaze point).

The distance computation section 113 acquires, from the reference point estimation section 111, position information indicating the position in the real space of each registered reference point (for example, the start point and the end point). On the basis of the position information about each registered reference point, the distance computation section 113 computes the distance between multiple reference points, and outputs information indicating the distance computation result to the output control section 115. Additionally, at this time, the distance computation section 113 may also output information indicating position information about each registered reference point to the output control section 115.

In addition, the distance computation section 113 may also successively acquire information indicating the position in the real space of the gaze point from the reference point estimation section 111. In this case, the distance computation section 113 may compute the distance between a registered reference point (for example, the start point) and the gaze point, for example, and output information indicating the distance computation result to the output control section 115. Additionally, at this time, the distance computation section 113 may also output information indicating the position in the real space of the gaze point to the output control section 115.

The output control section 115 presents, to the user through the output section 211, a virtual object on the basis of AR technology such that the virtual object is superimposed onto the real space.

Specifically, the output control section 115 acquires information indicating the recognition result of a real object and information indicating the estimation result of the position and the attitude of the input/output apparatus 20 in the real space from the position and attitude estimation section 103. With this arrangement, the output control section 115 becomes able to estimate the positional relationship between the input/output apparatus 20 and the recognized real object in the real space.

Additionally, for example, according to the positional relationship in the real space between the input/output apparatus 20 and the recognized real object, the output control section 115 causes the output section 211 to display a virtual object such that the virtual object is superimposed onto a desired position in the real space. Note that at this time, the output control section 115 may also execute various types of processing related to the generation of display information, such as rendering and the like, in order to present a virtual object as computer graphics (CG).

Additionally, the output control section 115 may also acquire information indicating the distance computation result from the distance computation section 113, and on the basis of the information, cause the output section 211 to display display information corresponding to the distance computation result. In addition, at this time, the output control section 115 may also acquire position information about each registered reference point from the distance computation section 113. In this case, on the basis of the acquired position information, the output control section 115 may cause the output section 211 to display the display information such that display information indicating each reference point is superimposed onto the position in the real space of each reference point.

In addition, the output control section 115 may also acquire information indicating a computation result of the distance between registered reference points and the gaze point from the distance computation section 113, and on the basis of the information, cause the output section 211 to display display information corresponding to the distance computation result. Additionally, at this time, the output control section 115 may also acquire information indicating the position in the real space of the gaze point from the distance computation section 113. In this case, for example, the output control section 115 may cause the output section 211 to display display information corresponding to the each positional relationship between the registered reference points and the gaze point (for example, the virtual objects V15a and V15b as illustrated in FIGS. 2 and 3).

Note that the configuration illustrated in FIG. 4 is merely one example, and the configuration of the information processing system 1 is not necessarily limited to the example illustrated in FIG. 4. As a specific example, the input/output apparatus 20 and the information processing apparatus 10 may also be configured in an integrated manner. Also, as another example, part of the configuration of the information processing apparatus 10 may also be provided in a different apparatus (such as the input/output apparatus 20 or an external server, for example) from the information processing apparatus 10.

Also, the above description focuses on a case in which the input/output apparatus 20 is configured as what is called a see-through HMD as illustrated in FIG. 1, but as described earlier, the input/output apparatus 20 may also be configured as a video see-through HMD or a retinal projection HMD. Note that in this case, part of the configuration and processing of the information processing apparatus 10 obviously may be substituted as necessary. As a specific example, in the case in which the input/output apparatus 20 is configured as a video see-through HMD, it is sufficient for the output control section 115 to cause the output section 211 to display an image in which a virtual object is superimposed onto an image captured by the first imaging section 201.

Also, in the example described above, an example of acquiring an image of a body (real object) in the real space and depth information indicating the distance from the input/output apparatus 20 to the body on the basis of images captured by a stereo camera is described. On the other hand, insofar as it is possible to acquire an image of the body in the real space and depth information indicating the distance from the input/output apparatus 20 to the body, the configuration for acquiring the image and the depth information is not particularly limited. For example, a distance measurement section for measuring the distance may also be provided apart from the imaging section for acquiring an image of the body in the real space. Note that the configuration of the distance measurement section obviously is not particularly limited. As a more specific example, the distance from the input/output apparatus 20 to the body may be measured on the basis of a methods such as motion parallax, time of flight (TOF), and structured light.

Herein, TOF refers to a method of projecting light such as infrared rays onto the subject and measuring, for each pixel, the time for the contributed light to be reflected by the subject and return, and thereby obtaining an image (also called a depth map) including the distance (depth) to the subject on the basis of the measurement results. Also, structure light is a method of irradiating the subject with a pattern by light such as infrared rays and capturing an image, and on the basis of changes in the pattern obtained from the imaging result, obtaining a depth map including the distance (depth) to the subject. Also, motion parallax refers to a method of estimating the distance to the subject on the basis of parallax, even with what is called a monocular camera. Specifically, by moving the camera, the subject is captured from mutually different viewpoints, and the distance to the subject is measured on the basis of the parallax between the captured images. Note that by recognizing the motion distance and motion direction of the camera with various sensors at this time, it is possible to measure the distance to the subject more precisely. Note that the configuration of the imaging section (such as a monocular camera or stereo camera, for example) may be changed in accordance with the distance measuring method.

The above references FIG. 4 to describe an example of a functional configuration of the information processing system according to the present embodiment.

<1.4. Processes>

Figure 5:
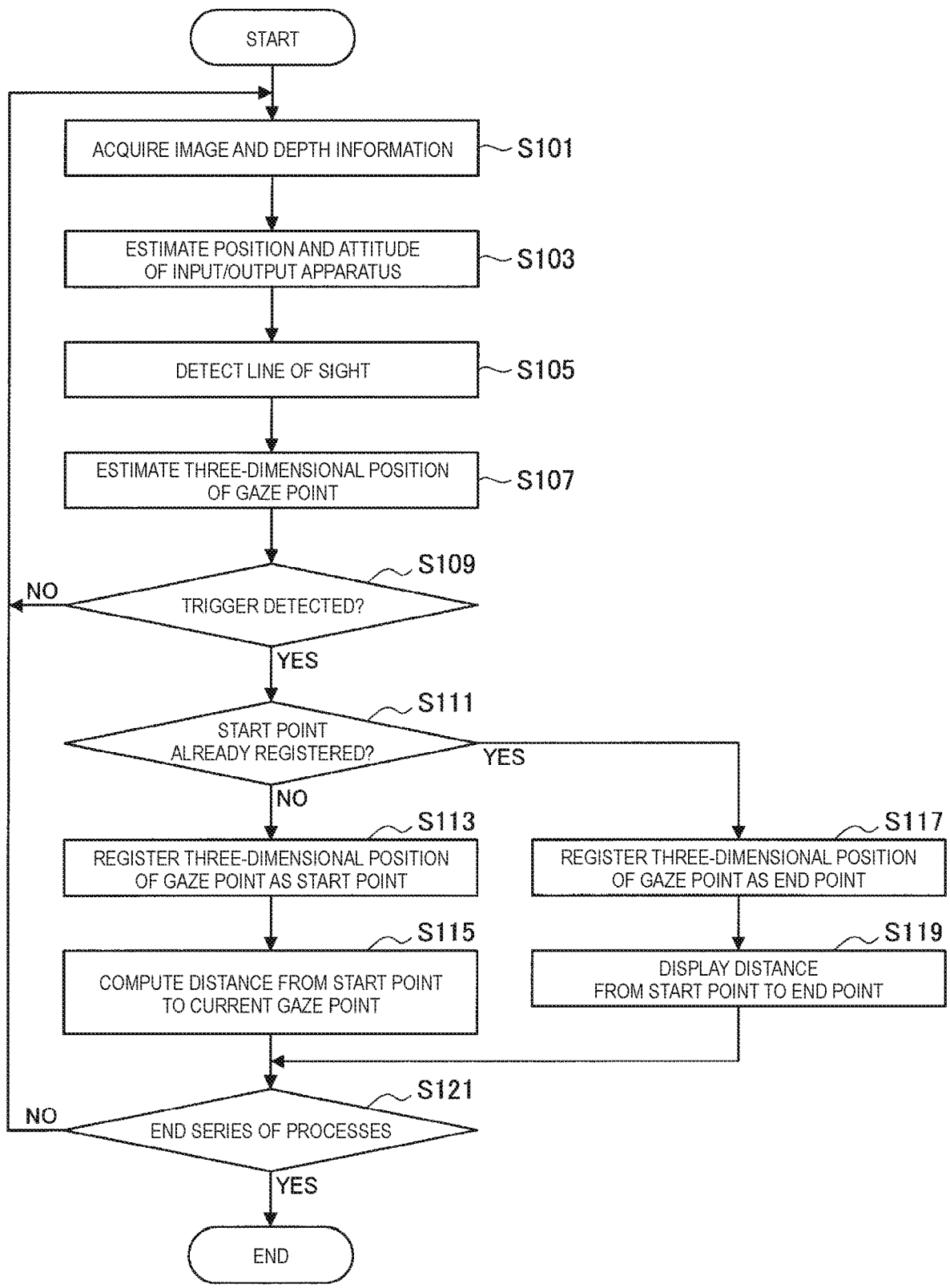
FIG. 5 is a flowchart illustrating an example of the flow of a series of processes of an information processing system according to the embodiment.

Next, FIG. 5 will be referenced to describe an example of the flow of a series of processes of the information processing system according to the present embodiment, with particular focus on processes related to the information processing apparatus 10. FIG. 5 is a flowchart illustrating an example of the flow of a series of processes of the information processing system according to the present embodiment.

First, on the basis of the right-eye image and the left-eye image captured by the first imaging section 201, the information processing apparatus 10 (depth detection section 101) computes the distance (depth) between the input/output apparatus 20 and the captured subject (that is, the real object). With this arrangement, an image of the real object and depth information indicating the distance between the input/output apparatus 20 and the real object are acquired (S101).

Next, on the basis of the acquired image and depth information, the information processing apparatus 10 (position and attitude estimation section 103) estimates the relative position and attitude of the input/output apparatus 20 with respect to the real object captured in the image. Also, at this time, the position and attitude estimation section 103 may also estimate the relative position and attitude of the input/output apparatus 20 with respect to the recognized real object on the basis of SLAM (S103). Note that the method of estimating the relative position and attitude of the input/output apparatus 20 with respect to the body is as described earlier as a process of the position and attitude estimation section 103.

In addition, the information processing apparatus 10 (line of sight detection section 105) detects the line-of-sight direction on the basis of an image of the user's eyeball captured by the second imaging section 203, and the positional relationship between the eyeball and the second imaging section 203 (S105).

Next, on the basis of detection result of the line-of-sight direction and the acquired depth information, the information processing apparatus 10 (gaze point detection section 107) detects the position in the real space at which the user's line of sight is pointing (that is, the position in the real space of the gaze point) as a relative position based on the position and the attitude of the input/output apparatus 20. In addition, on the basis of the detection result of the position in the real space of the gaze point and estimation result of the position and the attitude of the input/output apparatus 20 in the real space, the information processing apparatus 10 (reference point estimation section 111) estimates the three-dimensional position in the real space of the gaze point as an absolute position (S107).

Note that as long as a predetermined trigger based on user input through the input section 205 is not detected (S109, NO), the information processing apparatus 10 successively executes the series of processes indicated by the reference signs from S101 to S107. Additionally, in the case in which the predetermined trigger based on user input is detected (S109, YES), the information processing apparatus 10 executes a process related to the registration of the start point and the end point.

For example, in the case in which the start point has not been registered (S111, NO), the information processing apparatus 10 (reference point estimation section 111) registers the three-dimensional position in the real space of the gaze point at the time the trigger is detected as the start point (S113). After the registration of the start point, the information processing apparatus 10 (distance computation section 113) computes the distance from the registered start point to the current gaze point (S115).

In addition, in the case in which the start point already has been registered (S111, YES), the information processing apparatus 10 (reference point estimation section 111) registers the three-dimensional position in the real space of the gaze point at the time the trigger is detected as the end point (S117). In this case, the information processing apparatus 10 (distance computation section 113) computes the distance from the registered start point to the end point. Subsequently, the information processing apparatus 10 (output control section 115) causes the output section 211 of the input/output apparatus 20 to display display information based on the distance computation result.

The information processing apparatus 10 executes the series of processes described above (S121, NO) until instructed by the user to end the process (for example, end an application). Additionally, when instructed by the user to end the process (S121, YES), the information processing apparatus 10 ends the series of processes described above.

The above references FIG. 5 to describe an example of the flow of a series of processes of the information processing system according to the present embodiment, with particular focus on the processes of the information processing apparatus 10.

<2.4. Evaluation>

As described above, in the information processing system according to the present embodiment, the user first puts on the input/output apparatus 20, and specifies a start point and an end point of the measurement of a distance in the real space by line of sight. At this time, the information processing apparatus 10 estimates the position in the real space of a reference point, such as a start point, end point, or the like, on the basis of each image captured from multiple different viewpoints by the input/output apparatus 20, and the estimation result of the position and the attitude of the input/output apparatus 20 at each viewpoint. Also, on the basis of the estimation result of the position in the real space of each of the start point and the end point, the information processing apparatus 10 computes (measures) the distance between the start point and the end point. Subsequently, the information processing apparatus 10 presents display information based on the computation result of the distance between the start point and the end point to the user through the input/output apparatus 20. According to such a configuration, the user becomes able to measure distance in the real space by a simpler operation using the input/output apparatus 20, without measuring the distance by actually using a tool such as a ruler or a tape measure.

In addition, in the information processing system according to the present embodiment, during the series of operations related to the measurement of distance in the real space, the position and the attitude of the input/output apparatus 20 are estimated successively on the basis of localization technology such as SLAM or the like. According to such a configuration, in the case of registering each reference point, such as the start point, end point, or the like, it becomes possible to estimate the position in the real space of the reference point based on the position and the attitude of the input/output apparatus 20 at the time of the registration (in other words, the viewpoint at the time of the registration). For this reason, according to the system according to the present embodiment, it becomes possible to estimate the distance between the start point and the end point, even in cases in which it is difficult to keep each of the positions in the real space to register as the start point and the end point contained at the same time inside the image captured by the input/output apparatus 20. Note that situations in which it is difficult to keep each of the positions in the real space to register as the start point and the end point contained at the same time inside the image include, for example, the case in which the start point and the end point are relatively distant, the case in which an obstruction exists between the start point and the end point, and the like.

Note that the example described above describes an example of a case in which the distance between a start point and an end point is measured by registering the start point and the end point as reference points, but the configuration is not necessarily limited to only the same mode. As a specific example, the information processing system according to the present embodiment may also be configured such that three or more reference points can be registered, and the distance between each of the registered three or more reference points can be measured. As a more specific example, in the case in which, after an end point is registered, a different end point is newly registered, the information processing apparatus 10 may treat the previously registered end point as a waypoint, and compute the distance between the start point and the waypoint, and the distance between the waypoint and the newly registered end point. Also, the number of waypoints is not limited to one, and multiple waypoints may be registered. The same applies to the information processing system according to the other embodiments and modifications described later.

3. Second Embodiment

Next, an example of an information processing system according to the second embodiment of the present disclosure will be described.

<3.1. Measurement Method>

Figure 6:
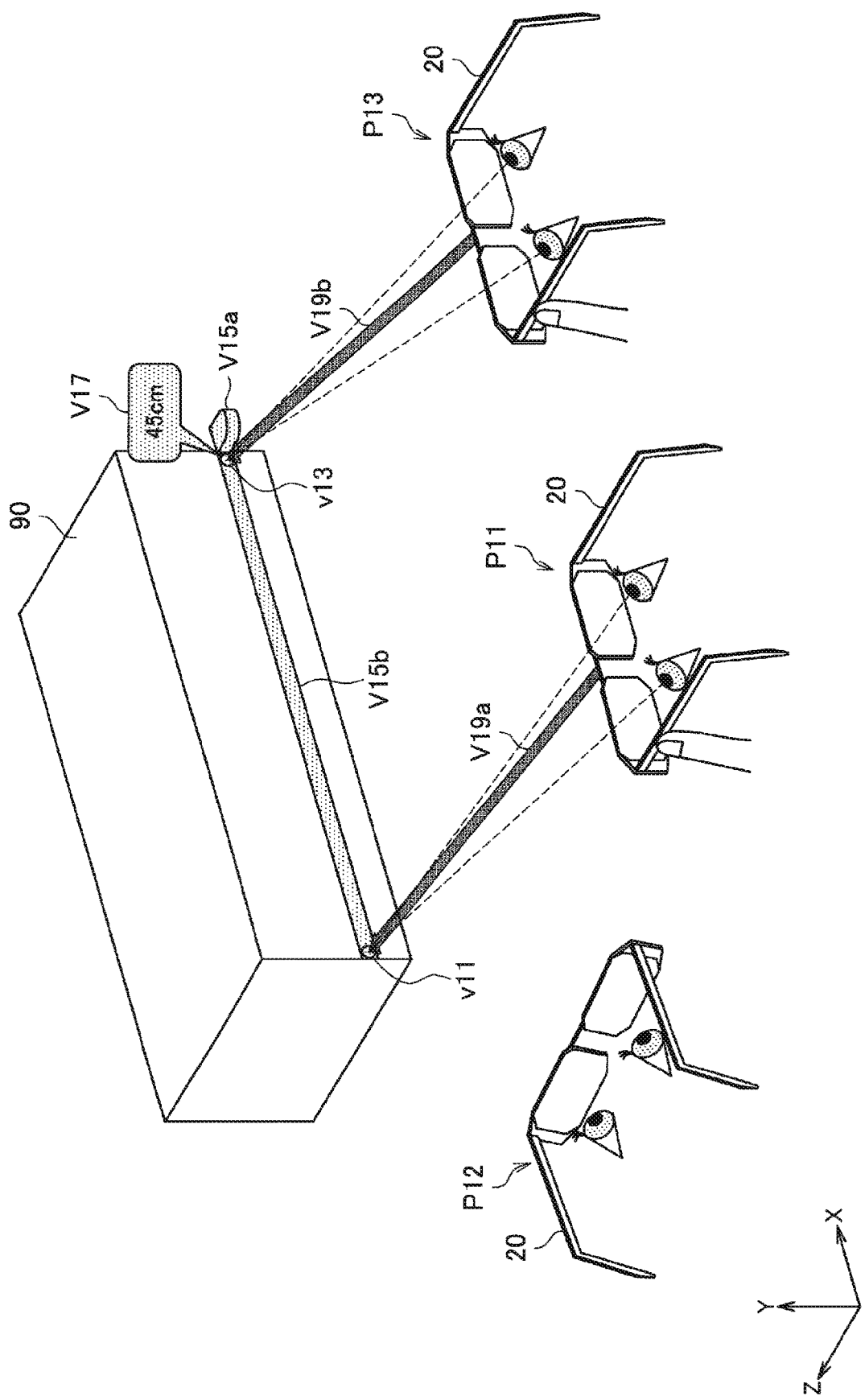
FIG. 6 is an explanatory diagram for explaining an overview of an information processing system according to a second embodiment of the present disclosure.

First, FIG. 6 will be referenced to describe an example of a method of measuring distance in a real space using the information processing system according to the present embodiment. For example, FIG. 6 is an explanatory diagram for explaining an overview of the information processing system according to the present embodiment, and illustrates an example of a method of measuring distance in a real space. Note that in FIG. 6, to make the features of the information processing system according to the present embodiment easier to understand, both a real object and a virtual object are presented together.

The information processing system according to the present embodiment detects the line of sight of the user wearing the input/output apparatus 20, and on the basis of the detection result of the line of sight, presents a virtual object V19 for specifying a reference point, such as a start point, end point, or the like, to the user through the input/output apparatus 20. For example, in the example illustrated in FIG. 6, arrow-shaped virtual objects V19a and V19b that indicate the line-of-sight direction of the user are presented. The user, by adjusting the direction and length of the virtual object V19 presented in accordance with the detection result of one's own line of sight on the basis of operations through the input/output apparatus 20, specifies the start point and the end point of a measurement of distance in the real space.

Specifically, first, the user puts on the input/output apparatus 20 and gazes at a position in the real space to register as the start point, as illustrated by the reference sign P11, and performs a predetermined operation related to the placement of the virtual object V19 with respect to the input/output apparatus 20. Receiving the operation, the system detects the user's line of sight, and presents a virtual object V19a corresponding to the detected line-of-sight direction (that is, line-of-sight vector) to the user through the input/output apparatus 20 such that the virtual object V19a is superimposed onto the real space.

Subsequently, as illustrated as the reference sign P12, the user references the virtual object V19a presented as through superimposed onto the real space from a different viewpoint (for example, a different angle), and by an operation via the input/output apparatus 20, adjusts the direction and the length of the virtual object V19a. By such an operation, the user specifies the position in the real space to register as the start point with the virtual object V19a. Receiving this operation, the system registers the position in the real space specified by the virtual object V19a as the start point. For example, in the example illustrated in FIG. 6, the system registers the position in the real space that the arrow-shaped virtual object V19a is pointing to as the start point.

In addition, the user registers an end point by a similar method as the start point. For example, as illustrated as the reference sign P13, the user gazes at a position in the real space to register as the end point, and performs a predetermined operation. Receiving the operation, the system detects the user's line of sight, and presents a virtual object V19b to the user in accordance with the detection result. Additionally, the user references the presented virtual object V19b from a different viewpoint, and by an operation via the input/output apparatus 20, adjusts the direction and the length of the virtual object V19b to thereby specify the position in the real space to register as the end point. Subsequently, the system registers the position in the real space that the arrow-shaped virtual object V19b is pointing to as the end point.

Note that the operations after the registration of the start point and the end point are similar to the first embodiment described above. Namely, on the basis of the three-dimensional position of each of the registered start point and end point, the system measures (computes) the distance between the start point and the end point, and presents various display information according to the measurement result to the user through the input/output apparatus 20. According to such a configuration, the user becomes able to measure distance in the real space by a simpler operation using the input/output apparatus 20, without measuring the distance by actually using a tool such as a ruler or a tape measure.

Also, in the information processing system according to the present embodiment, by adjusting the direction and the length of the virtual object V19, the position in the real space to register as a reference point, such as a start point, end point, or the like, is specified. For this reason, in the information processing system according to the present embodiment, unlike the information processing system according to the first embodiment, it is also possible to register a position in the real space where a real object does not exist as a reference point.

The above references FIG. 6 to describe an example of a method of measuring distance in a real space using the information processing system according to the present embodiment.

<3.2. Process>

Figure 7:
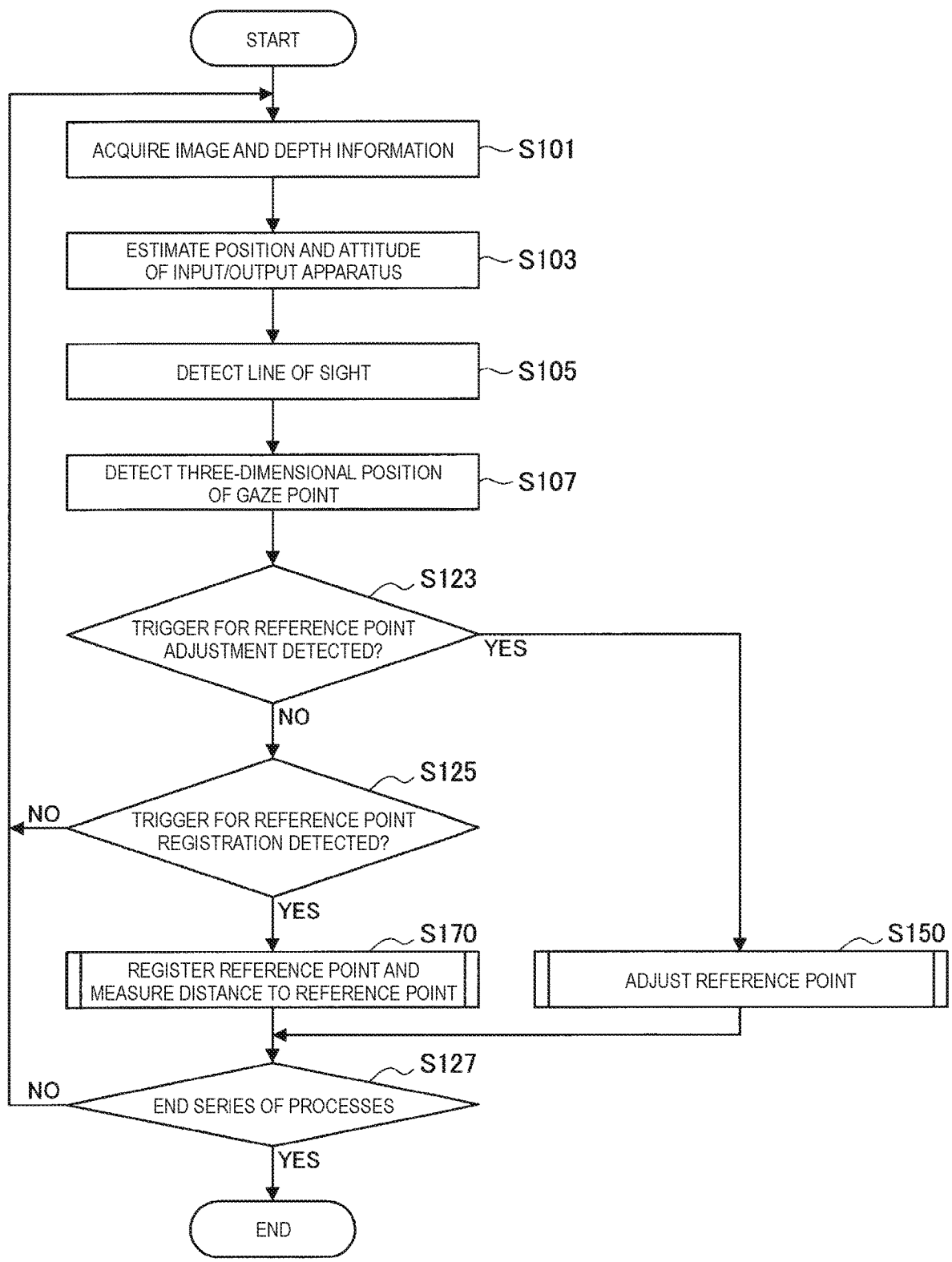
FIG. 7 is a flowchart illustrating an example of the flow of a series of processes of an information processing system according to the embodiment.
Figure 8:
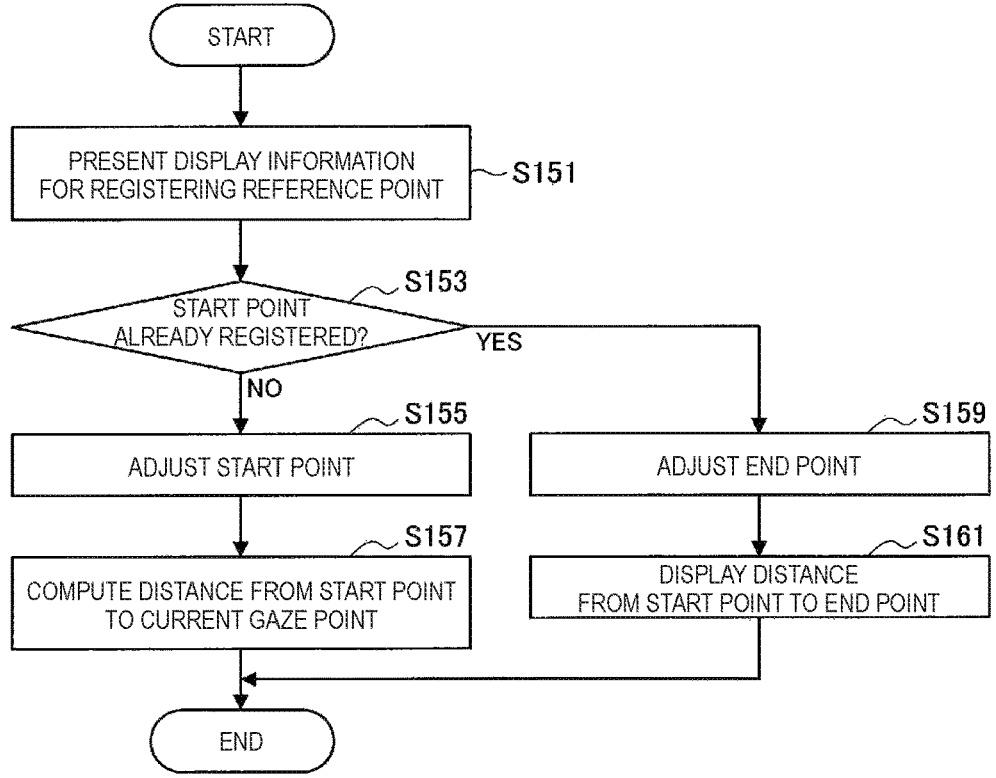
FIG. 8 is a flowchart illustrating an example of the flow of a series of processes of an information processing system according to the embodiment.
Figure 9:
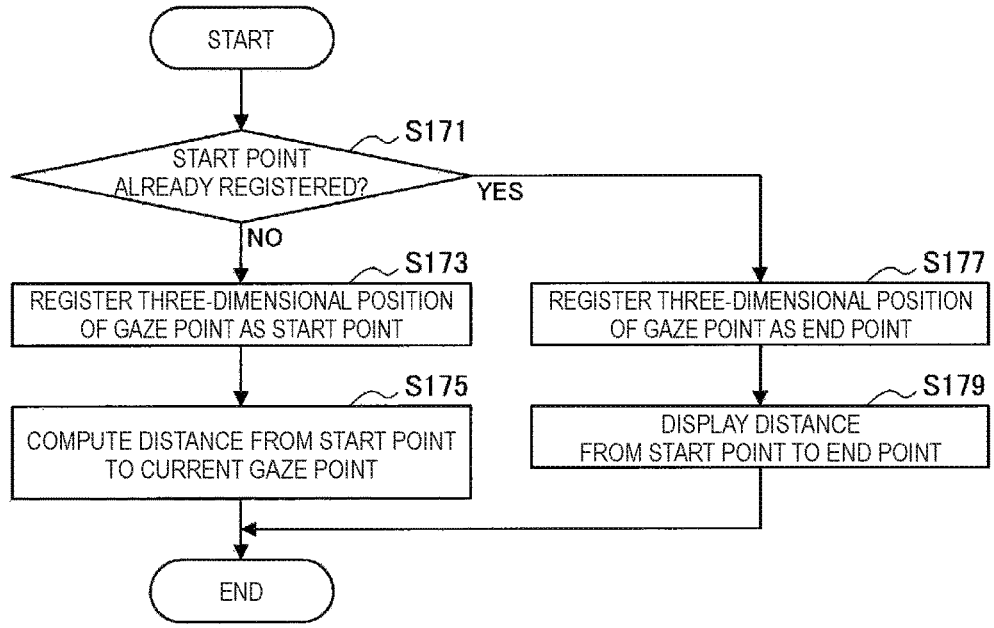
FIG. 9 is a flowchart illustrating an example of the flow of a series of processes of an information processing system according to the embodiment.

Next. FIGS. 7 to 9 will be referenced to describe an example of the flow of a series of processes of the information processing system according to the present embodiment, with particular focus on the processes of the information processing apparatus 10. FIGS. 7 to 9 are flowcharts illustrating an example of the flow of a series of processes of the information processing system according to the present embodiment. Note that the basic functional configuration of the information processing system according to the present embodiment is similar to the system according to the first embodiment described earlier (see FIG. 4), but the processing in part of the configuration is different. Accordingly, in this description, the characteristics of the information processing system according to the present embodiment will be described in further detail, with particular focus on the processing that differs from the information processing system according to the first embodiment described earlier.

Note that the processes illustrated by the reference signs from S101 to S107 are similar to the information processing system according to the first embodiment described earlier (see FIG. 5). Namely, on the basis of the right-eye image and the left-eye image captured by the first imaging section 201, the information processing apparatus 10 (depth detection section 101) acquires an image of a real object and depth information indicating the distance between the input/output apparatus 20 and the real object (S101). Next, on the basis of the acquired image and depth information, the information processing apparatus 10 (position and attitude estimation section 103) estimates the relative position and attitude of the input/output apparatus 20 with respect to the real object captured in the image (S103). In addition, the information processing apparatus 10 (line of sight detection section 105) detects the line-of-sight direction on the basis of an image of the user's eyeball captured by the second imaging section 203, and the positional relationship between the eyeball and the second imaging section 203 (S105). Also, on the basis of detection result of the line-of-sight direction and the acquired depth information, the information processing apparatus 10 (gaze point detection section 107) detects the position in the real space of the gaze point as a relative position based on the position and the attitude of the input/output apparatus 20. In addition, on the basis of the detection result of the position in the real space of the gaze point and estimation result of the position and the attitude of the input/output apparatus 20 in the real space, the information processing apparatus 10 (reference point estimation section 111) estimates the three-dimensional position in the real space of the gaze point as an absolute position (S107). Also, at this time, the information processing apparatus 10 (reference point estimation section 111) may also estimate the three-dimensional position and direction in the real space of a vector connecting the input/output apparatus 20 and the gaze point (in other words, the line-of-sight vector) as an absolute position.

Note that as long as a predetermined trigger based on user input through the input section 205 is not detected (S123, NO and S125, NO), the information processing apparatus 10 successively executes the series of processes indicated by the reference signs from S101 to S107.

Also, in the case of detecting a trigger for adjusting a reference point (S123, YES), the information processing apparatus 10 executes each process related to the adjustment of a reference point, such as a start point, end point, or the like (S150). For example, FIG. 8 is a flowchart illustrating an example of the flow of a series of processes related to the adjustment of a reference point.

Specifically, the information processing apparatus 10 (display control section 115) presents a virtual object V19 for specifying a reference point to the user through the output section 211 of the input/output apparatus 20, in accordance with the three-dimensional position and direction in the real space of a vector connecting the input/output apparatus 20 and the gaze point (S151).

Next, in the case in which a start point has not been registered (S153, NO), the information processing apparatus 10 (reference point estimation section 111) adjusts the three-dimensional position of a reference point to be registered as the start point, in accordance with an adjustment result of the direction and the length of the virtual object V19 based on user input. In other words, the information processing apparatus 10 recognizes the three-dimensional position that the virtual object V19 of adjusted direction and length is pointing to as the adjusted position of the reference point (S155). After the adjustment of the position of the reference point to be registered as the start point, the information processing apparatus 10 (distance computation section 113) computes the distance from the reference point with the adjusted position to the current gaze point (S157).

Also, in the case in which a start point already has been registered (S153, YES), the information processing apparatus 10 (reference point estimation section 111) adjusts the three-dimensional position of a reference point to be registered as the end point, in accordance with an adjustment result of the direction and the length of the virtual object V19 based on user input. In other words, the information processing apparatus 10 recognizes the three-dimensional position that the virtual object V19 of adjusted direction and length is pointing to as the adjusted position of the reference point (S159). In this case, the information processing apparatus 10 (distance computation section 113) computes the distance from the start point to the reference point with the adjusted position (that is, the reference point to be registered as the end point), and causes the output section 211 of the input/output apparatus 20 to display display information based on the distance computation result.

Also, as illustrated in FIG. 7, in the case of detecting a trigger for registering a reference point (S123, NO and S125, YES), the information processing apparatus 10 executes processes related to the registration of a reference point, such as a start point, end point, or the like, and the measurement of the distance (S170). For example, FIG. 9 is a flowchart illustrating an example of the flow of a series of processes related to the registration of a reference point and the measurement of the distance.

Specifically, in the case in which the start point has not been registered (S171, NO), the information processing apparatus 10 (reference point estimation section 111) registers the three-dimensional position in the real space of the gaze point at the time the trigger is detected (that is, the position that the virtual object V19 is pointing to) as the start point (S173). After the registration of the start point, the information processing apparatus 10 (distance computation section 113) computes the distance from the registered start point to the current gaze point (S175).

Also, in the case in which the start point already has been registered (S171, YES), the information processing apparatus 10 (reference point estimation section 111) registers the three-dimensional position in the real space of the gaze point at the time the trigger is detected (that is, the position that the virtual object V19 is pointing to) as the end point (S177). In this case, the information processing apparatus 10 (distance computation section 113) computes the distance from the registered start point to the end point, and causes the output section 211 of the input/output apparatus 20 to display display information based on the distance computation result.

Additionally, as illustrated in FIG. 7, the information processing apparatus 10 executes the series of processes described above (S127, NO) until instructed by the user to end the process (for example, end an application). Additionally, when instructed by the user to end the process (S127, YES), the information processing apparatus 10 ends the series of processes described above.

The above references FIGS. 7 to 9 to describe an example of the flow of a series of processes of the information processing system according to the present embodiment, with particular focus on the processes of the information processing apparatus 10.

<3.3. Evaluation>

As described above, in the information processing system according to the present embodiment, the information processing apparatus 10 detects the line of sight of the user wearing the input/output apparatus 20, and on the basis of the detection result of the line of sight, presents a virtual object V19 for specifying a reference point, such as a start point, end point, or the like, to the user through the input/output apparatus 20. The user, by adjusting the direction and length of the virtual object V19 presented in accordance with the detection result of one's own line of sight on the basis of operations through the input/output apparatus 20, specifies the start point and the end point of a measurement of distance in the real space. The information processing apparatus 10 recognizes the three-dimensional positions of the start point and the end point according to the position in the real space that the virtual object V19 of adjusted direction and length is pointing to, and computes (measures) the distance between the start point and the end point. Subsequently, the information processing apparatus 10 presents display information based on the computation result of the distance between the start point and the end point to the user through the input/output apparatus 20. According to such a configuration, the user becomes able to measure distance in the real space by a simpler operation using the input/output apparatus 20, without measuring the distance by actually using a tool such as a ruler or a tape measure.

Also, in the information processing system according to the present embodiment, by adjusting the direction and the length of the virtual object V19, the position in the real space to register as a reference point, such as a start point, end point, or the like, is specified. For this reason, in the information processing system according to the present embodiment, unlike the information processing system according to the first embodiment, it is also possible to register a position in the real space where a real object does not exist as a reference point.

4. Third Embodiment

Next, an example of an information processing system according to the third embodiment of the present disclosure will be described.

<4.1. Measurement Method>

Figure 10:
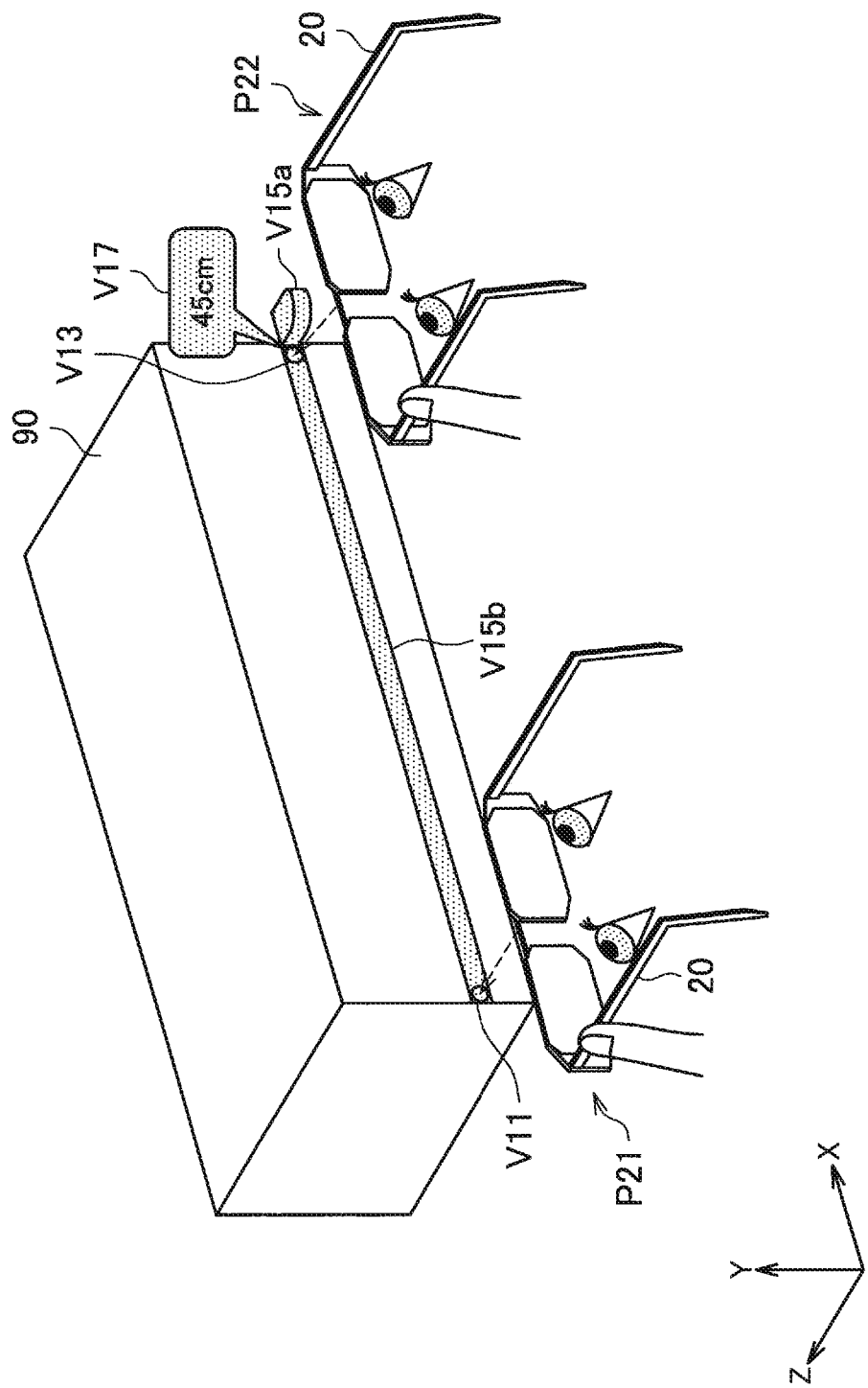
FIG. 10 is an overview of an information processing system according to a third embodiment of the present disclosure.
Figure 11:
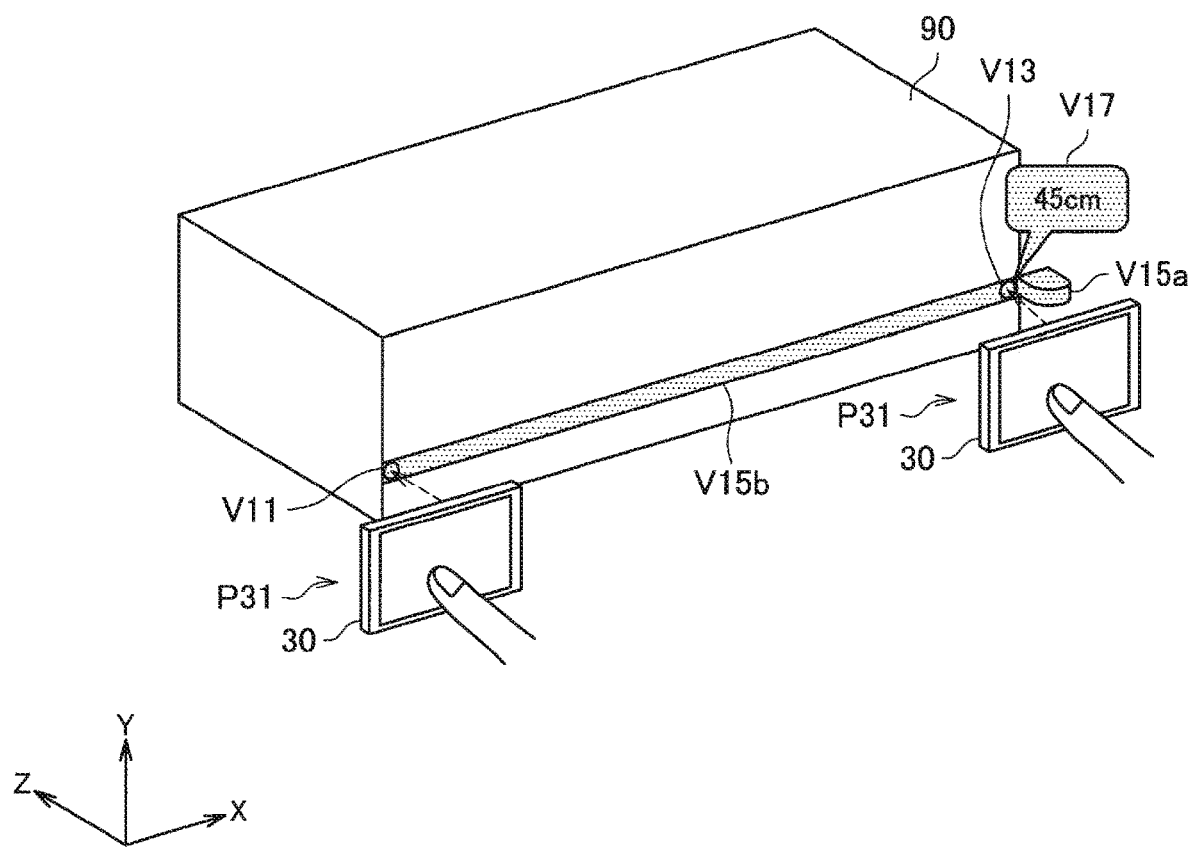
FIG. 11 is an explanatory diagram for explaining an overview of an information processing system according to the embodiment.

First, FIGS. 10 and 11 will be referenced to describe an example of a method of measuring distance in a real space using the information processing system according to the present embodiment. For example, FIGS. 10 and 11 are explanatory diagrams for explaining an overview of the information processing system according to the present embodiment, and illustrates an example of a method of measuring distance in a real space. Note that in FIGS. 10 and 11, to make the features of the information processing system according to the present embodiment easier to understand, both a real object and a virtual object are presented together.

For example, as illustrated in FIG. 10, in the information processing system according to the present embodiment, the user causes the input/output apparatus 20 to touch or approach a desired position on the real object 90, and thereby specifies the start point and the end point of a measurement of distance in the real space.

Specifically, first, as illustrated by the reference sign P21, the user causes the input/output apparatus 20 to touch or approach a position in the real space to register as the start point, and performs a predetermined operation related to the registration of the start point with respect to the input/output apparatus 20. Receiving the operation, the system estimates the three-dimensional position in the real space that is touched or approached by the input/output apparatus 20 on the basis of the position and the attitude of the input/output apparatus 20 and the distance (depth) between the input/output apparatus 20 and the real object 90, and registers the estimated position as the start point.

Also, the registration of the end point is similar to the case of the start point. For example, as illustrated by the reference sign P22, the user causes the input/output apparatus 20 to touch or approach a position in the real space to register as the end point, and performs a predetermined operation related to the registration of the end point with respect to the input/output apparatus 20. Receiving the operation, the system estimates the three-dimensional position in the real space that is touched or approached by the input/output apparatus 20 on the basis of the position and the attitude of the input/output apparatus 20 and the distance (depth) between the input/output apparatus 20 and the real object 90, and registers the estimated position as the end point.

Note that the operations after the registration of the start point and the end point are similar to each embodiment described above. Namely, on the basis of the three-dimensional position of each of the registered start point and end point, the system measures (computes) the distance between the start point and the end point, and presents various display information according to the measurement result to the user through the input/output apparatus 20. According to such a configuration, the user becomes able to measure distance in the real space by a simpler operation using the input/output apparatus 20, without measuring the distance by actually using a tool such as a ruler or a tape measure.

Also, in the system according to the present embodiment, a terminal apparatus 30 like what is called a smartphone, a tablet terminal, or the like may also be used instead of the input/output apparatus 20 as the apparatus for measuring distance in the real space. For example, FIG. 11 illustrates an overview of a procedure in the case of using the terminal apparatus 30 to measure distance in the real space in the information processing system according to the present embodiment. Note that in the information processing system according to the present embodiment, similarly to the input/output apparatus 20, it is assumed that the terminal apparatus 30 is configured to be capable of acquiring an image of a real object, and depth information indicating the distance between the terminal apparatus 30 and the real object.

For example, in the example illustrated in FIG. 11, as illustrated by the reference sign P31, the user causes the terminal apparatus 30 to touch or approach a position in the real space to register as the start point, and performs a predetermined operation related to the registration of the start point with respect to the terminal apparatus 30. Receiving the operation, the system estimates the three-dimensional position in the real space that is touched or approached by the terminal apparatus 30 on the basis of the position and the attitude of the terminal apparatus 30 and the distance (depth) between the terminal apparatus 30 and the real object 90, and registers the estimated position as the start point.

Also, the registration of the end point is similar to the case of the start point. For example, as illustrated by the reference sign P32, the user causes the terminal apparatus 30 to touch or approach a position in the real space to register as the end point, and performs a predetermined operation related to the registration of the end point with respect to the terminal apparatus 30. Receiving the operation, it is sufficient for the system to estimate the three-dimensional position in the real space that is touched or approached by the terminal apparatus 30 on the basis of the position and the attitude of the terminal apparatus 30 and the distance (depth) between the terminal apparatus 30 and the real object 90, and register the estimated position as the end point.

FIGS. 10 and 11 has been referenced to describe an example of a method of measuring distance in a real space using the information processing system according to the present embodiment.

<4.2. Functional Configuration>

Figure 12:
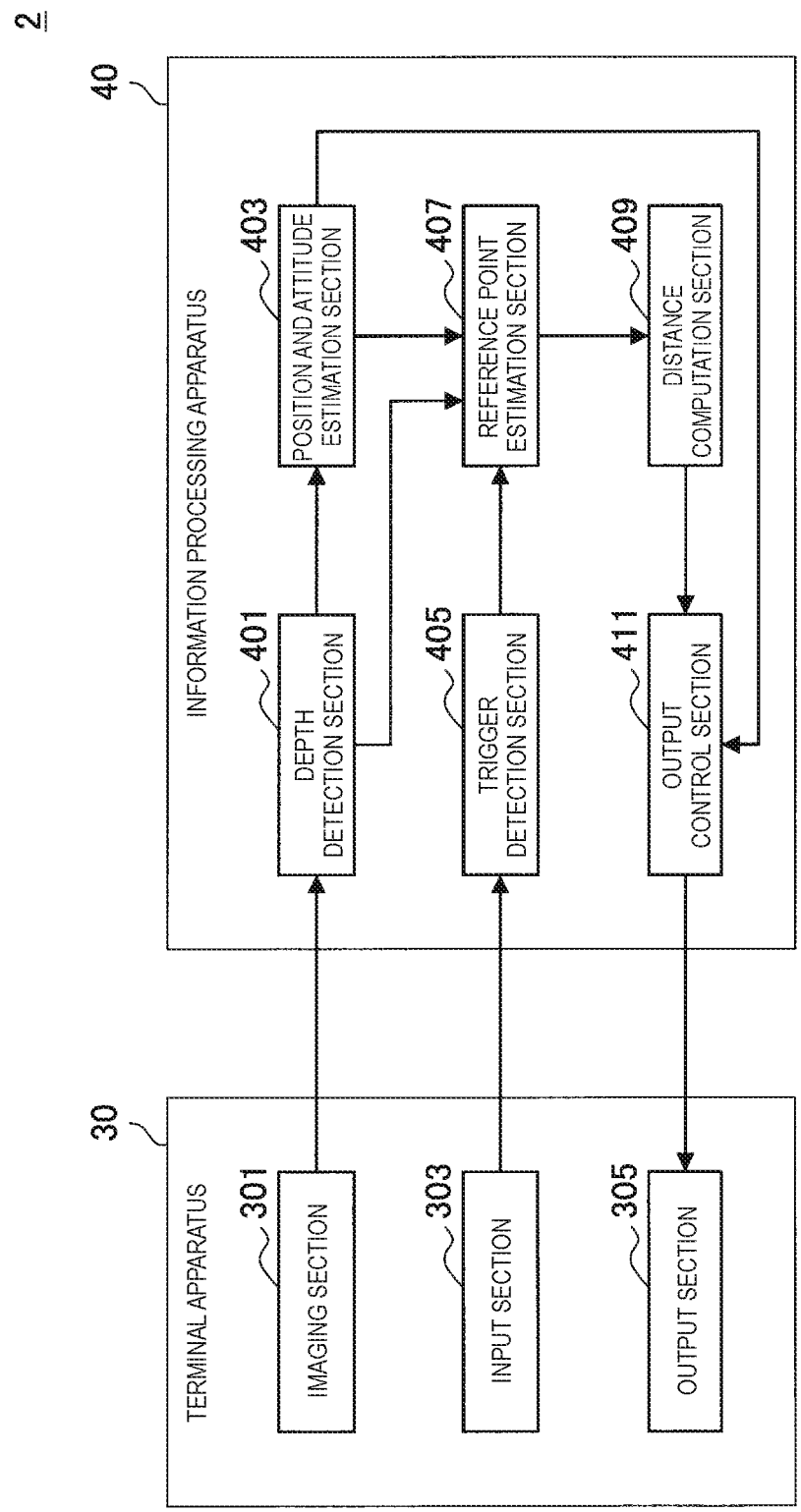
FIG. 12 is a block diagram illustrating an example of a functional configuration of an information processing system according to the embodiment.

Next, FIG. 12 will be referenced to describe an example of the functional configuration of the information processing system according to the present embodiment. FIG. 12 is a block diagram illustrating an example of the functional configuration of the information processing system according to the present embodiment. Note that in this description, as illustrated in FIG. 11, the functional configuration of the information processing system according to the present embodiment will be described with focus on the case of using the terminal apparatus 30 to measure distance in the real space.

As illustrated in FIG. 12, the information processing system 2 according to the present embodiment includes a terminal apparatus 30 and an information processing apparatus 40, for example. Note that the terminal apparatus 30 corresponds to the terminal apparatus 30 illustrated in FIG. 11.

First, the description will focus on the configuration of the terminal apparatus 30. As illustrated in FIG. 12, the terminal apparatus 30 includes an imaging section 301, an input section 303, and an output section 305.

The imaging section 301 is configured as what is called a stereo camera and captures images of a subject from multiple different positions, or in other words, an image of the subject from a viewpoint corresponding to the right-eye side (that is, a right-eye image), and an image of the subject from a viewpoint corresponding to the left-eye side (that is, a left-eye image). Subsequently, the imaging section 301 outputs the captured right-eye image and left-eye image to the information processing apparatus 40.

For example, the input section 303 is configured by an input interface like a touch panel, a button, or the like. In the case of receiving an operation from the user, the input section 303 outputs control information indicating the content of the operation to the information processing apparatus 40. Note that, similarly to the input/output apparatus 20 (see FIG. 4) according to the first embodiment described earlier, the terminal apparatus 30 may also include a sound collection section for collecting the user's voice.

The output section 305 is configured as a display or the like, and displays display information, such as images and the like, on the basis of control from the information processing apparatus 40.

Note that the terminal apparatus 30 may also be provided with a detection section (omitted from illustration) for acquiring information that indicates changes in the position and the attitude of the terminal apparatus 30, like an acceleration sensor, an angular velocity sensor, and the like, for example.

Next, the description will focus on the configuration of the information processing apparatus 40. As illustrated in FIG. 12, the information processing apparatus 40 includes a depth detection section 401, a position and attitude estimation section 403, a trigger detection section 405, a reference point estimation section 407, a distance computation section 409, and an output control section 411. Note that the depth detection section 401, the position and attitude estimation section 403, and the trigger detection section 405 correspond to the depth detection section 101, the position and attitude estimation section 103, and the trigger detection section 109 in the information processing apparatus 10 (see FIG. 4) according to the first and second embodiments described earlier.

In other words, on the basis of the right-eye image and the left-eye image captured by the imaging section 301, the depth detection section 401 acquires an image of the subject and depth information indicating the distance between the terminal apparatus 30 and the subject. Subsequently, the depth detection section 401 outputs the acquired image of the subject and depth information to the position and attitude estimation section 403. Note that the depth detection section 401 may also output the depth information to the reference point estimation section 407.

The position and attitude estimation section 403 is a configuration for executing processes related to estimating the position and the attitude of the terminal apparatus 30 in the real space (also called localization-related processes). In other words, the position and attitude estimation section 403 acquires the image of the subject and the depth information from the depth detection section 401, and on the basis of the acquired image and depth information, recognizes a real object captured as the subject in the image. Additionally, on the basis of the recognition result of the real object and the acquired depth information, the position and attitude estimation section 403 estimates the relative position and attitude of the terminal apparatus 30 with respect to the real object. Note that at this time, the position and attitude estimation section 403 may also estimate the relative position and attitude of the terminal apparatus 30 with respect to the recognized real object on the basis of SLAM. Subsequently, the position and attitude estimation section 403 outputs information indicating the estimation result of the position and the attitude of the terminal apparatus 30 in the real space to the reference point estimation section 407. In addition, the position and attitude estimation section 403 may also output information indicating the estimation result of the position and the attitude of the terminal apparatus 30 in the real space to the output control section 411.

The trigger detection section 405 acquires, from the input section 303, information indicating user input through the input section 303. Additionally, in the case in which the acquired information indicating user input indicates predetermined operation content, the trigger detection section 405 treats the user input as a trigger, and issues an instruction associated with the operation content to the reference point estimation section 407. On the basis of such a configuration, for example, the trigger detection section 405 treats predetermined user input as a trigger, and instructs the reference point estimation section 407 to register a reference point such as a start point or an end point related to the measurement of distance.

The reference point estimation section 407 acquires, from the position and attitude estimation section 403, information indicating the estimation result of the position and the attitude of the terminal apparatus 30 in the real space. In addition, the reference point estimation section 407 may also acquire depth information from the depth detection section 401. Additionally, in the case of receiving an instruction related to the registration of a reference point from the trigger detection section 405, the reference point estimation section 407 estimates the position in the real space of a reference point, such as a start point, end point, or the like, on the basis of the estimation result of the position and the attitude of the terminal apparatus 30.

More specifically, in the case of receiving an instruction related to the registration of a reference point from the trigger detection section 405, the reference point estimation section 407 may treat the position of a specific spot on the terminal apparatus 30 at the time (in other words, the position of the terminal apparatus 30) as the gaze point described in the first and second embodiments described earlier, and register the gaze point as the reference point. Also, on the basis of the estimation result of the position and the attitude of the terminal apparatus 30 and the acquired depth information, the reference point estimation section 407 may treat a position (that is, a position on the real object) distanced in the imaging direction of the imaging section 301 from the position of the specific spot on the terminal apparatus 30 by the distance indicated by the depth information as the gaze point, and register the gaze point as the reference point.

As above, the reference point estimation section 407 registers reference points, such as a start point, end point, or the like, on the basis of instructions from the trigger detection section 405, and outputs position information indicating the position in the real space of each registered reference point to the distance computation section 409.

The distance computation section 409 corresponds to the distance computation section 113 in the information processing apparatus 10 (see FIG. 4) according to the first and second embodiments described earlier. In other words, the distance computation section 409 acquires, from the reference point estimation section 407, position information indicating the position in the real space of each registered reference point. Also, on the basis of the position information about each registered reference point, the distance computation section 409 computes the distance between multiple reference points, and outputs information indicating the distance computation result to the output control section 411. Additionally, at this time, the distance computation section 409 may also output information indicating position information about each registered reference point to the output control section 411. Also, the distance computation section 409 may compute the distance between a registered reference point (for example, the start point) and the gaze point, and output information indicating the computed distance to the output control section 411.

The output control section 411 presents, to the user through the output section 305, a virtual object on the basis of AR technology such that the virtual object is superimposed onto the real space.

As a specific example, the output control section 411 acquires information indicating the recognition result of a real object and information indicating the estimation result of the position and the attitude of the terminal apparatus 30 in the real space from the position and attitude estimation section 103. With this arrangement, the output control section 411 becomes able to estimate the positional relationship between the terminal apparatus 30 and the recognized real object in the real space. Subsequently, it is sufficient for the output control section 411 to cause the output section 211 to display an image in which a virtual object is superimposed onto the image captured by the imaging section 301, in accordance with the positional relationship between the terminal apparatus 30 and the recognized real object in the real space.

Additionally, the output control section 411 may also acquire information indicating the distance computation result from the distance computation section 409, and on the basis of the information, cause the output section 305 to display display information corresponding to the distance computation result. This operation is similar to the output control section 115 in the information processing apparatus 10 according to the first and second embodiments described earlier.

Note that the configuration illustrated in FIG. 12 is merely one example, and the configuration of the information processing system 2 is not necessarily limited to the example illustrated in FIG. 12. The same applies to the information processing system 1 according to the first embodiment described earlier. In addition, insofar as it is possible to acquire an image of the body in the real space and depth information indicating the distance from the terminal apparatus 30 to the body, the configuration for acquiring the image and the depth information is not particularly limited, similarly to the information processing system 1 according to the first embodiment described earlier.

The above references FIG. 12 to describe an example of a functional configuration of the information processing system according to the present embodiment.

<4.3. Process>

Figure 13:
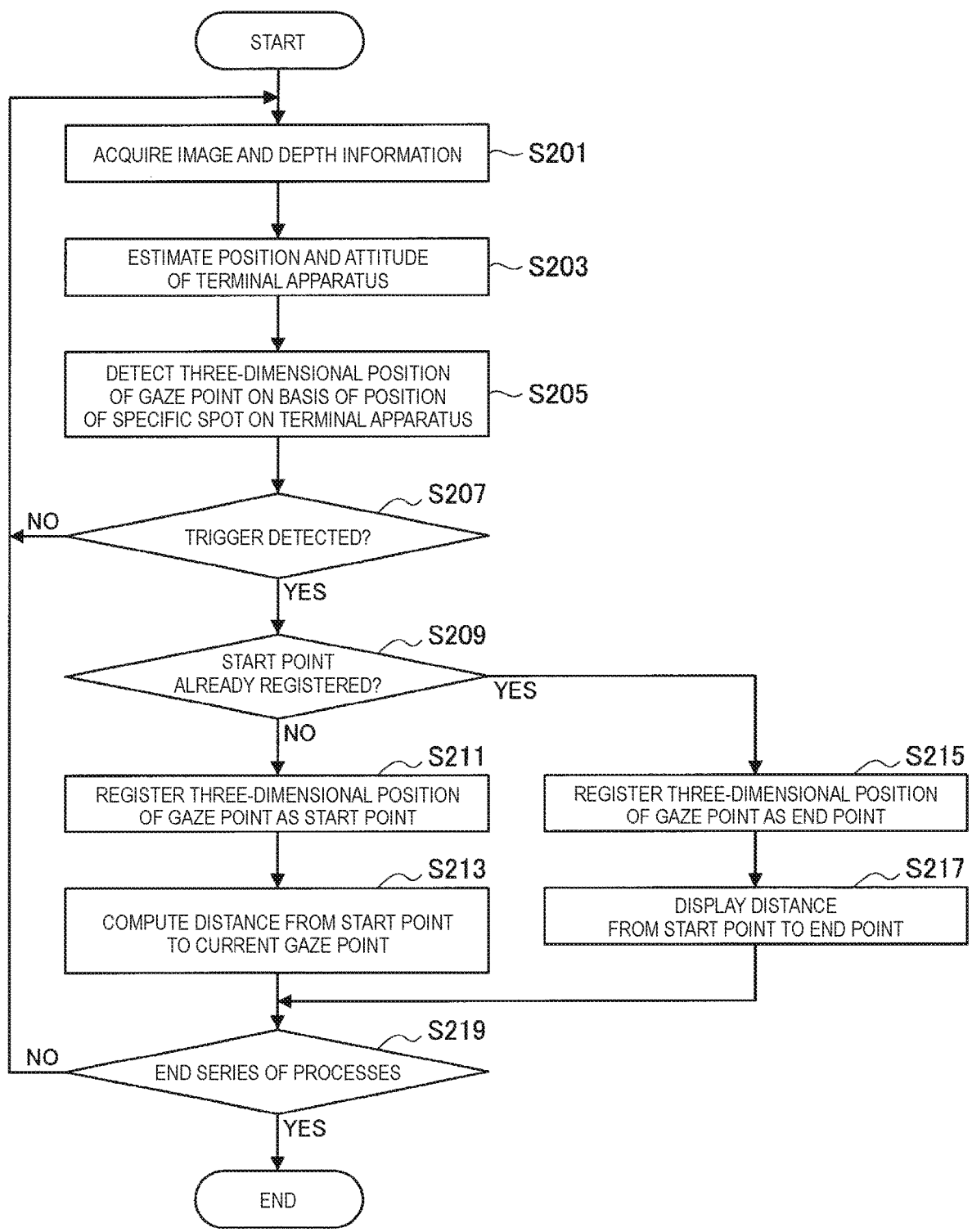
FIG. 13 is a flowchart illustrating an example of the flow of a series of processes of an information processing system according to the embodiment.

Next, FIG. 13 will be referenced to describe an example of the flow of a series of processes of the information processing system according to the present embodiment, with particular focus on the processes of the information processing apparatus 40. FIG. 13 is a flowchart illustrating an example of the flow of a series of processes of the information processing system according to the present embodiment.

First, on the basis of the right-eye image and the left-eye image captured by the imaging section 301, the information processing apparatus 40 (depth detection section 401) computes the distance (depth) between the terminal apparatus 30 and the captured subject (that is, the real object). With this arrangement, an image of the real object and depth information indicating the distance between the terminal apparatus 30 and the real object are acquired (S201).

Next, on the basis of the acquired image and depth information, the information processing apparatus 40 (position and attitude estimation section 403) estimates the relative position and attitude of the terminal apparatus 30 with respect to the real object captured in the image. Also, at this time, the position and attitude estimation section 403 may also estimate the relative position and attitude of the terminal apparatus 30 with respect to the recognized real object on the basis of SLAM (S203).

Next, on the basis of the estimation result of the position and the attitude of the terminal apparatus 30, the information processing apparatus 40 (reference point estimation section 407) treats the position of a specific spot on the terminal apparatus 30 as the gaze point, and estimates the three-dimensional position in the real space of the gaze point as an absolute position (S205).

Note that as long as a predetermined trigger based on user input through the input section 303 is not detected (S207, NO), the information processing apparatus 40 successively executes the series of processes indicated by the reference signs from S201 to S205. Additionally, in the case in which the predetermined trigger based on user input is detected (S207, YES), the information processing apparatus 40 executes a process related to the registration of the start point and the end point.

For example, in the case in which the start point has not been registered (S209, NO), the information processing apparatus 40 (reference point estimation section 407) registers the three-dimensional position in the real space of the gaze point at the time the trigger is detected as the start point (S211). After the registration of the start point, the information processing apparatus 40 (distance computation section 409) computes the distance from the registered start point to the current gaze point (S213).

In addition, in the case in which the start point already has been registered (S209, YES), the information processing apparatus 40 (reference point estimation section 407) registers the three-dimensional position in the real space of the gaze point at the time the trigger is detected as the end point (S215). In this case, the information processing apparatus 40 (distance computation section 409) computes the distance from the registered start point to the end point. Subsequently, the information processing apparatus 40 (output control section 411) causes the output section 305 of the terminal apparatus 30 to display display information based on the distance computation result.

The information processing apparatus 40 executes the series of processes described above (S219, NO) until instructed by the user to end the process (for example, end an application). Additionally, when instructed by the user to end the process (S219, YES), the information processing apparatus 40 ends the series of processes described above.

The above references FIG. 13 to describe an example of the flow of a series of processes of the information processing system according to the present embodiment, with particular focus on the processes of the information processing apparatus 40.

<4.4. Evaluation>

As described above, in the information processing system according to the present embodiment, for example, the user causes the terminal apparatus 30 to touch or approach a desired position in the real space, and performs a predetermined operation with respect to the terminal apparatus 30, thereby specifying the start point and the end point of a measurement of distance in the real space. At this time, for example, the information processing apparatus 40 recognizes the estimated position in the real space of the terminal apparatus 30 as the position of a reference point, such as a start point, end point, or the like. Also, on the basis of the recognition result of the position in the real space of each of the start point and the end point, the information processing apparatus 40 computes (measures) the distance between the start point and the end point. Subsequently, the information processing apparatus 40 presents display information based on the computation result of the distance between the start point and the end point to the user through the terminal apparatus 30. According to such a configuration, the user becomes able to measure distance in the real space by a simpler operation using the terminal apparatus 30, without measuring the distance by actually using a tool such as a ruler or a tape measure.

Particularly, according to the information processing system according to the present embodiment, in a situation in which it is possible to touch or approach a real object whose distance is to be measured, the user becomes able to execute the distance measurement with a simpler procedure compared to the information processing system according to the first and second embodiments described earlier.

5. Fourth Embodiment

Next, an example of an information processing system according to the fourth embodiment of the present disclosure will be described.
<5.1. Measurement Method>

Figure 14:
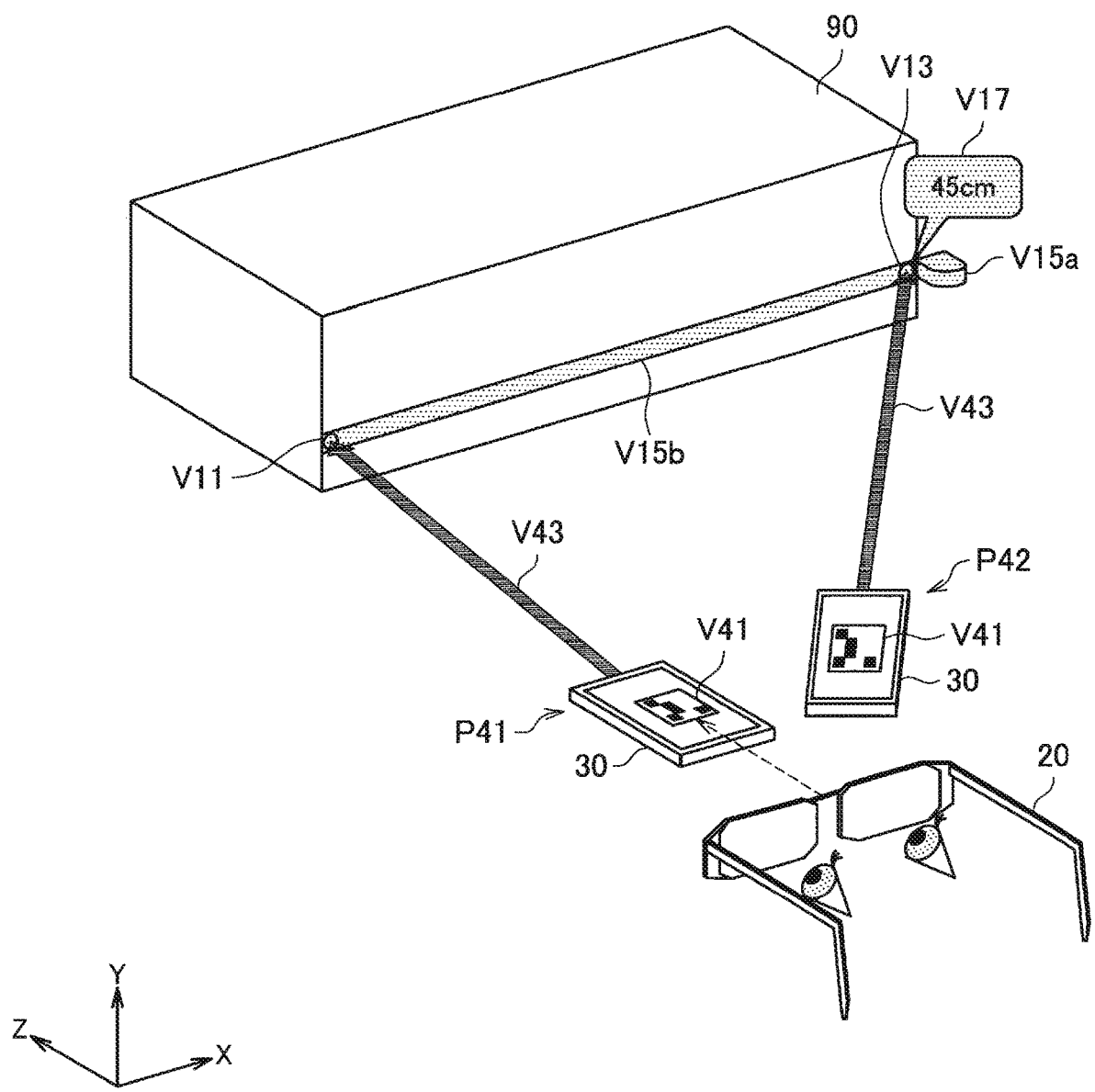
FIG. 14 is an overview of an information processing system according to a fourth embodiment of the present disclosure.

First, FIG. 14 will be referenced to describe an example of a method of measuring distance in a real space using the information processing system according to the present embodiment. For example, FIG. 14 is an explanatory diagram for explaining an overview of the information processing system according to the present embodiment, and illustrates an example of a method of measuring distance in a real space. Note that in FIG. 14, to make the features of the information processing system according to the present embodiment easier to understand, both a real object and a virtual object are presented together.

The information processing system according to the present embodiment recognizes a body such as the terminal apparatus 30 or the like, on the basis of an image captured by an imaging section (the first imaging section 201 configured as a stereo camera described earlier) provided in the input/output apparatus 20. Subsequently, in accordance with the recognition result, the system presents a virtual object V43 for specifying a reference point, such as a start point, end point, or the like, to the user through the input/output apparatus 20, such that the virtual object V43 is superimposed onto the recognized body (that is, the terminal apparatus 30). For example, in the example illustrated in FIG. 14, the system recognizes a marker V41 presented on a display or the like of the terminal apparatus 30, and recognizes the terminal apparatus 30 in accordance with the recognition result of the marker V41. With this arrangement, the system becomes able to recognize the position and the attitude of the terminal apparatus 30 in the real space on the basis of the recognition result of the marker V41. In addition, in accordance with the recognition result of the terminal apparatus 30, the system presents the virtual object V43 extending from the terminal apparatus 30 in the direction in which the terminal apparatus 30 is pointing. The user, by changing the position and the direction of the terminal apparatus 30 while confirming the virtual object V43 through the input/output apparatus 20, uses the virtual object V43 to specify positions in the real space to register as the start point and the end point of a measurement of distance in the real space.

Specifically, first, the user visually confirms the terminal apparatus 30 on which the marker V41 is presented while wearing the input/output apparatus 20. Receiving the operation, on the basis of an image captured by the imaging section of the input/output apparatus 20, the system recognizes the position and the attitude of the terminal apparatus 30 on which the marker V41 is presented, and on the basis of the recognition result, presents the virtual object V43 to the user through the input/output apparatus 20. Note that at this time, the system may also control the display mode (such as the length, for example) of the virtual object V43, in accordance with a predetermined operation with respect to the terminal apparatus 30 or the input/output apparatus 20.

Next, as illustrated by the reference sign P41, the user adjusts the position and the direction of the terminal apparatus 30 to thereby point to the position in the real space to register as the start point with the presented virtual object V43, and performs a predetermined operation related to the registration of the start point with respect to the terminal apparatus 30 or the input/output apparatus 20. Receiving this operation, the system registers the position in the real space specified by the virtual object V43 as the start point. For example, in the example illustrated in FIG. 14, the system registers the position in the real space that the arrow-shaped virtual object V43 is pointing to as the start point.

In addition, the user registers an end point by a similar method as the start point. For example, as illustrated by the reference sign P42, the user points to a position in the real space to register as the end point with the presented virtual object V43, and performs a predetermined operation related to the registration of the end point with respect to the terminal apparatus 30 or the input/output apparatus 20.

Receiving this operation, the system registers the position in the real space that the arrow-shaped virtual object V43 is pointing to as the end point.

Note that the operations after the registration of the start point and the end point are similar to the first to third embodiments described above. Namely, on the basis of the three-dimensional position of each of the registered start point and end point, the system measures (computes) the distance between the start point and the end point, and presents various display information according to the measurement result to the user through the input/output apparatus 20. According to such a configuration, the user becomes able to measure distance in the real space by a simpler operation using the input/output apparatus 20, without measuring the distance by actually using a tool such as a ruler or a tape measure.

Note that the example illustrated in FIG. 14 describes an example of using the terminal apparatus 30 as the body on which the virtual object V43 is superimposed. On the other hand, insofar as the user is able to specify a reference point, such as a start point, end point, or the like by the presented virtual object V43, the body on which the virtual object V43 is superimposed (in other words, the body which is identified to present the virtual object V43) is not necessarily limited to the terminal apparatus 30 only. For example, instead of the terminal apparatus 30, a card or the like on which the marker V41 is printed may also be used.

The above references FIG. 14 to describe an example of a method of measuring distance in a real space using the information processing system according to the present embodiment.

<5.2. Functional Configuration>

Figure 15:
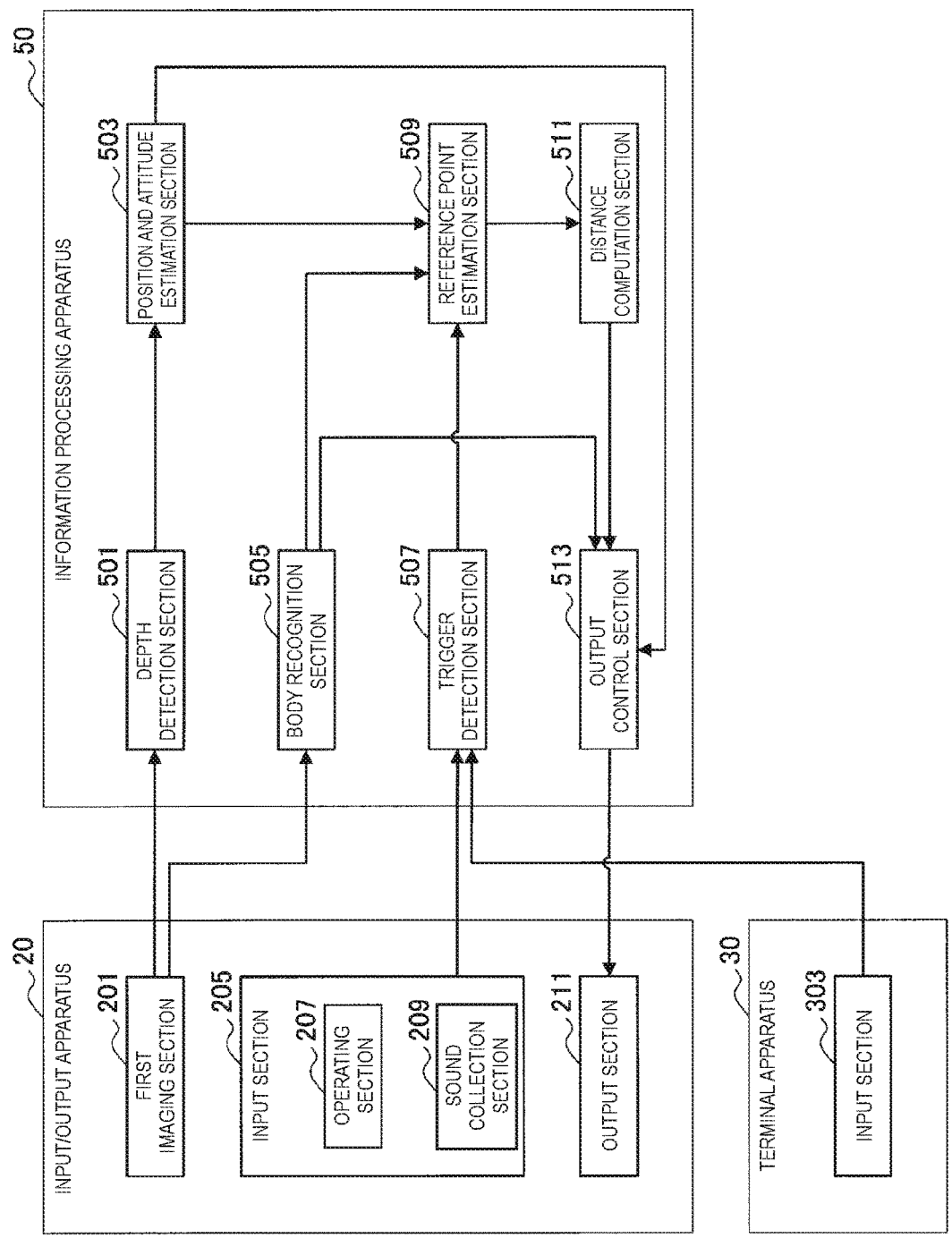
FIG. 15 is a block diagram illustrating an example of a functional configuration of an information processing system according to the embodiment.

Next, FIG. 15 will be referenced to describe an example of the functional configuration of the information processing system according to the present embodiment. FIG. 15 is a block diagram illustrating an example of the functional configuration of the information processing system according to the present embodiment.

As illustrated in FIG. 15, the information processing system 3 according to the present embodiment includes an input/output apparatus 20, a terminal apparatus 30, and an information processing apparatus 50, for example. Note that the input/output apparatus 20 and the terminal apparatus 30 correspond to the input/output apparatus 20 and the terminal apparatus 30 illustrated in FIG. 14.

First, the description will focus on the configuration of the input/output apparatus 20. As illustrated in FIG. 15, the input/output apparatus 20 according to the present embodiment includes a first imaging section 201, an input section 205, and an output section 211. Note that the first imaging section 201, the input section 205, and the output section 211 are substantially the same as the first imaging section 201, the input section 205, and the output section 211 in the input/output apparatus 20 (see FIG. 4) according to the first embodiment described earlier, and a detailed description will be omitted.

Next, the description will focus on the configuration of the terminal apparatus 30. As illustrated in FIG. 15, the terminal apparatus 30 includes the input section 303. Note that the input section 303 is substantially the same as the input section 303 in the terminal apparatus 30 (see FIG. 12) according to the third embodiment described earlier, and a detailed description will be omitted.

Next, the description will focus on the configuration of the information processing apparatus 50. As illustrated in FIG. 15, the information processing apparatus 50 includes a depth detection section 501, a position and attitude estimation section 503, a body recognition section 505, a trigger detection section 507, a reference point estimation section 509, a distance computation section 511, and an output control section 513. Note that the depth detection section 501 and the position and attitude estimation section 503 correspond to the depth detection section 501 and the position and attitude estimation section 503 in the information processing apparatus 10 (see FIG. 4) according to the first and second embodiments described earlier.

In other words, on the basis of the right-eye image and the left-eye image captured by the first imaging section 201, the depth detection section 501 acquires an image of the subject and depth information indicating the distance between the input/output apparatus 20 and the subject. Subsequently, the depth detection section 501 outputs the acquired image of the subject and depth information to the position and attitude estimation section 503.

The position and attitude estimation section 503 is a configuration for executing a process related to the estimation of the position and the attitude of the input/output apparatus 20 in the real space (a process related to what is called localization). In other words, the position and attitude estimation section 503 acquires the image of the subject and the depth information from the depth detection section 501, and on the basis of the acquired image and depth information, recognizes a real object captured as the subject in the image. Additionally, on the basis of the recognition result of the real object and the acquired depth information, the position and attitude estimation section 503 estimates the relative position and attitude of the input/output apparatus 20 with respect to the real object. Note that at this time, the position and attitude estimation section 503 may also estimate the relative position and attitude of the input/output apparatus 20 with respect to the recognized real object on the basis of SLAM. Subsequently, the position and attitude estimation section 503 outputs information indicating the estimation result of the position and the attitude of the input/output apparatus 20 in the real space to the reference point estimation section 509. In addition, the position and attitude estimation section 503 may also output information indicating the estimation result of the position and the attitude of the input/output apparatus 20 in the real space to the output control section 513.

The body recognition section 505 is a configuration for recognizing the position and the attitude of the terminal apparatus 30 on the basis of an image captured by the first imaging section 201. For example, it is sufficient for the body recognition section 505 to recognize the marker V41 presented on the terminal apparatus 30 as illustrated in FIG. 14 from an image captured by the first imaging section 201, and on the basis of the recognition result, recognize the position and the attitude of the terminal apparatus 30. Note that since the method of recognizing the terminal apparatus 30 is substantially the same as the method by which the position and attitude estimation section 503 recognizes a real object captured as the subject in an image, a detailed description will be omitted. Subsequently, the body recognition section 505 outputs information indicating the recognition result of the position and the attitude of the terminal apparatus 30 to the reference point estimation section 509. In addition, the body recognition section 505 may also output information indicating the recognition result of the position and the attitude of the terminal apparatus 30 to the output control section 513.

Note that, as described above, the processing of the body recognition section 505 may resemble at least part of the processing of the position and attitude estimation section 503 in some cases. For this reason, the position and attitude estimation section 503 may also execute the processing of the body recognition section 505.

The trigger detection section 507 acquires, from the input section 303, information indicating user input through the input section 303. Also, the trigger detection section 507 may acquire, from the input section 205, information indicating user input through the input section 205. Additionally, in the case in which the acquired information indicating user input indicates predetermined operation content, the trigger detection section 507 treats the user input as a trigger, and issues an instruction associated with the operation content to the reference point estimation section 509. On the basis of such a configuration, for example, the trigger detection section 507 treats predetermined user input as a trigger, and instructs the reference point estimation section 509 to register a reference point such as a start point or an end point related to the measurement of distance.

The reference point estimation section 509 acquires, from the position and attitude estimation section 503, information indicating the estimation result of the position and the attitude of the input/output apparatus 20 in the real space. Also, the reference point estimation section 509 acquires information indicating the recognition result of the position and the attitude of the terminal apparatus 30 from the body recognition section 505. Additionally, in the case of receiving an instruction related to the registration of a reference point from the trigger detection section 507, the reference point estimation section 509 estimates the position in the real space of a reference point, such as a start point, end point, or the like, on the basis of the estimation result of the position and the attitude of the input/output apparatus 20, and the recognition result of the position and the attitude of the terminal apparatus 30.

More specifically, on the basis of the recognition result of the position and the attitude of the terminal apparatus 30, the reference point estimation section 509 recognizes the position and the attitude of the terminal apparatus 30 in the real space as a relative position based on the position and the attitude of the input/output apparatus 20. Also, the reference point estimation section 509 recognizes the position and the attitude of the input/output apparatus 20 in the real space on the basis of information acquired from the position and attitude estimation section 503. With this arrangement, the reference point estimation section 509 becomes able to estimate the three-dimensional position and attitude in the real space of the terminal apparatus 30 as an absolute position, for example.

Next, by the estimation result of the three-dimensional position and attitude in the real space of the terminal apparatus 30, the reference point estimation section 509 estimates the position in the real space that the terminal apparatus 30 is pointing to (that is, in FIG. 14, the position in the real space specified by the virtual object V41). Note that the position in the real space estimated by such a process corresponds to the gaze point described in the first and second embodiments described earlier. Accordingly, in this description, for the sake of convenience, the position in the real space estimated by the above process (that is, the position in the real space that the terminal apparatus 30 is pointing to) will be designated the "gaze point".

Note that at this time, the reference point estimation section 509 may also estimate the three-dimensional position in the real space of the gaze point, in accordance with an operation result with respect to the virtual object V41. More specifically, according to a result of adjusting the length of the virtual object V41, the reference point estimation section 509 may estimate a position distanced by the length of the virtual object V41 from the position in the real space of the terminal apparatus 30 in the direction that the terminal apparatus 30 is pointing as the position of the gaze point.

Additionally, the reference point estimation section 509 registers reference points, such as a start point, end point, or the like, on the basis of instructions related to the registration of a reference point from the trigger detection section 507, and outputs position information indicating the position in the real space of each registered reference point to the distance computation section 511.

Additionally, the reference point estimation section 509 may also successively output information indicating the position in the real space of a gaze point to the distance computation section 511. With this arrangement, the distance computation section 511 becomes able to recognize in real-time the position in the real space to which the terminal apparatus 30 faces.

The process of the distance computation section 511 is substantially similar to the process of the distance computation section 113 in the information processing apparatus 10 according to the first and second embodiments described above. In other words, the distance computation section 511 acquires, from the reference point estimation section 509, position information indicating the position in the real space of each registered reference point. On the basis of the position information about each registered reference point, the distance computation section 511 computes the distance between multiple reference points, and outputs information indicating the distance computation result to the output control section 513. Additionally, at this time, the distance computation section 511 may also output information indicating position information about each registered reference point to the output control section 513.

In addition, the distance computation section 511 may also successively acquire information indicating the position in the real space of the gaze point from the reference point estimation section 509. In this case, the distance computation section 511 may compute the distance between a registered reference point (for example, the start point) and the gaze point, for example, and output information indicating the distance computation result to the output control section 513. Additionally, at this time, the distance computation section 511 may also output information indicating the position in the real space of the gaze point to the output control section 513.

The output control section 513 presents, to the user through the output section 211, a virtual object on the basis of AR technology such that the virtual object is superimposed onto the real space. Note that since the process related to the presentation of a virtual object by the output control section 513 is substantially the same as the output control section 115 of the information processing apparatus 10 (see FIG. 4) according to the first and second embodiments described earlier, a detailed description will be omitted.

For example, the output control section 513 acquires information indicating the recognition result of the position and the attitude of the terminal apparatus 30 from the body recognition section 505. Also, the output control section 513 acquires, from the position and attitude estimation section 503, information indicating the estimation result of the position and the attitude of the input/output apparatus 20 in the real space. Subsequently, on the basis of the acquired information indicating the recognition result of the position and attitude of the terminal apparatus 30 and the acquired information indicating the estimation result of the position and the attitude of the input/output apparatus 20 in the real space, the output control section 513 may estimate the three-dimensional position and attitude in the real space of the terminal apparatus 30. Subsequently, for example, on the basis of the estimation result, the output control section 513 may cause the output section 211 to output a virtual object V41 such that the virtual object V41 is superimposed onto the terminal apparatus 30, as illustrated in FIG. 14.

Additionally, the output control section 513 may also acquire information indicating the distance computation result from the distance computation section 511, and on the basis of the information, cause the output section 211 to display display information corresponding to the distance computation result. This operation is similar to the output control section 115 in the information processing apparatus 10 according to the first and second embodiments described earlier.

Note that the configuration illustrated in FIG. 15 is merely one example, and the configuration of the information processing system 3 is not necessarily limited to the example illustrated in FIG. 15. The same applies to the information processing system 1 according to the first embodiment described earlier. In addition, insofar as it is possible to acquire an image of the body in the real space and depth information indicating the distance from the input/output apparatus 20 to the body, the configuration for acquiring the image and the depth information is not particularly limited, similarly to the information processing system 1 according to the first embodiment described earlier.

The above references FIG. 15 to describe an example of a functional configuration of the information processing system according to the present embodiment.

<5.3. Process>

Figure 16:
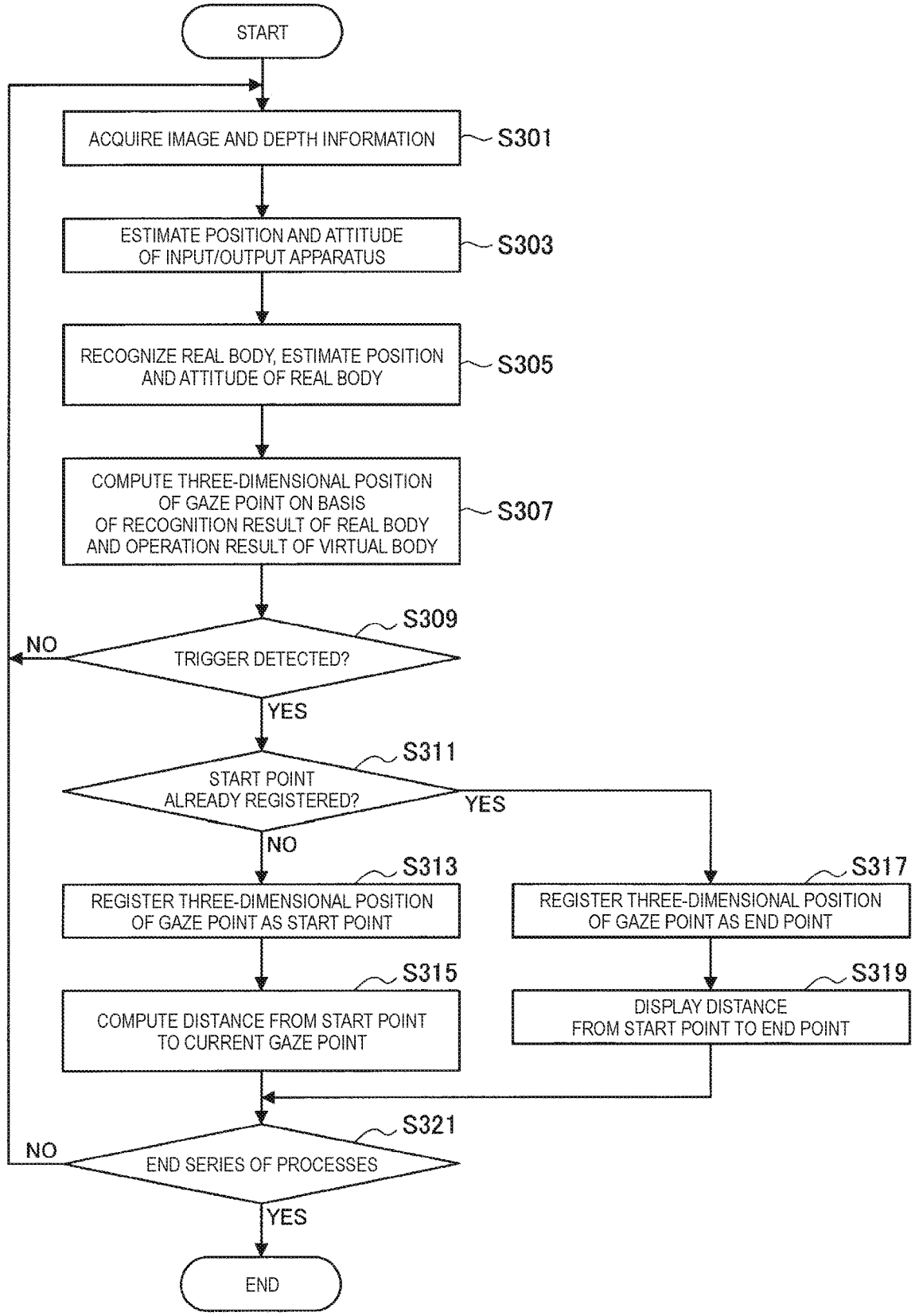
FIG. 16 is a flowchart illustrating an example of the flow of a series of processes of an information processing system according to the embodiment.

Next, FIG. 16 will be referenced to describe an example of the flow of a series of processes of the information processing system according to the present embodiment, with particular focus on the processes of the information processing apparatus 50. FIG. 16 is a flowchart illustrating an example of the flow of a series of processes of the information processing system according to the present embodiment.

First, on the basis of the right-eye image and the left-eye image captured by the first imaging section 201, the information processing apparatus 50 (depth detection section 501) computes the distance (depth) between the input/output apparatus 20 and the captured subject (that is, the real object). With this arrangement, an image of the real object and depth information indicating the distance between the input/output apparatus 20 and the real object are acquired (S301).

Next, on the basis of the acquired image and depth information, the information processing apparatus 50 (position and attitude estimation section 503) estimates the relative position and attitude of the input/output apparatus 20 with respect to the real object captured in the image. Also, at this time, the position and attitude estimation section 503 may also estimate the relative position and attitude of the input/output apparatus 20 with respect to the recognized real object on the basis of SLAM (S303).

Also, the information processing apparatus 50 (body recognition section 505) recognizes the position and the attitude of the terminal apparatus 30 on the basis of the right-eye image and the left-eye image captured by the first imaging section 201. Also, on the basis of the recognition result of the position and the attitude of the terminal apparatus 30, the information processing apparatus 50 (output control section 513) presents a virtual object V41 to the user through the input/output apparatus 20, such that the virtual object V41 is superimposed onto the terminal apparatus 30 (S305). Note that the method of recognizing the position and the attitude of the terminal apparatus 30 is as described earlier as a process of the body recognition section 505.

Next, on the basis of estimation result of the position and the attitude of the input/output apparatus 20 and the recognition result of the position and the attitude of the terminal apparatus 30, the information processing apparatus 50 (reference point estimation section 509) estimates the three-dimensional position in the real space that the terminal apparatus 30 is pointing to (that is, the position in the real space of the gaze point). Note that at this time, the information processing apparatus 50 may also estimate the three-dimensional position in the real space of the gaze point according to the result of an operation with respect to the virtual object V41 presented according to the recognition result of the position and the attitude of the terminal apparatus 30 (S307). Note that the method of estimating the position of the gaze point is as described earlier as the process of the reference point estimation section 509.

Note that as long as a predetermined trigger based on user input through the input section 205 or the input section 303 is not detected (S309, NO), the information processing apparatus 50 successively executes the series of processes indicated by the reference signs from S301 to S307. Additionally, in the case in which the predetermined trigger based on user input is detected (S309, YES), the information processing apparatus 50 executes a process related to the registration of the start point and the end point.

For example, in the case in which the start point has not been registered (311, NO), the information processing apparatus 50 (reference point estimation section 509) registers the three-dimensional position in the real space of the gaze point at the time the trigger is detected as the start point (313). After the registration of the start point, the information processing apparatus 50 (distance computation section 511) computes the distance from the registered start point to the current gaze point (S315).

In addition, in the case in which the start point already has been registered (311, YES), the information processing apparatus 50 (reference point estimation section 509) registers the three-dimensional position in the real space of the gaze point at the time the trigger is detected as the end point (S317). In this case, the information processing apparatus 50 (distance computation section 511) computes the distance from the registered start point to the end point. Subsequently, the information processing apparatus 50 (output control section 513) causes the output section 211 of the input-output apparatus 20 to display display information based on the distance computation result.

The information processing apparatus 50 executes the series of processes described above (S321, NO) until instructed by the user to end the process (for example, end an application). Additionally, when instructed by the user to end the process (S321. YES), the information processing apparatus 50 ends the series of processes described above.

The above references FIG. 16 to describe an example of the flow of a series of processes of the information processing system according to the present embodiment, with particular focus on the processes of the information processing apparatus 50.

<5.4. Evaluation>

As described above, in the information processing system according to the present embodiment, the information processing apparatus 50 recognizes a body such as the terminal apparatus 30 or the like, on the basis of an image captured by an imaging section provided in the input/output apparatus 20. Subsequently, in accordance with the recognition result, the information processing apparatus 50 presents a virtual object V43 for specifying a reference point, such as a start point, end point, or the like, to the user through the input/output apparatus 20, such that the virtual object V43 is superimposed onto the recognized body. Based on such a configuration, the user, by changing the position and the direction of the terminal apparatus 30 while confirming the virtual object V43 through the input/output apparatus 20, uses the virtual object V43 to specify positions in the real space to register as the start point and the end point. At this time, for example, the information processing apparatus 50 estimates the position in the real space specified by the virtual object V43 on the basis of the recognition result of the position and the attitude of the terminal apparatus 30, and registers the estimated position as the position of a reference point, such as a start point, end point, or the like.

Also, on the basis of the registration result of the position in the real space of each of the start point and the end point, the information processing apparatus 50 computes (measures) the distance between the start point and the end point. Subsequently, the information processing apparatus 50 presents display information based on the computation result of the distance between the start point and the end point to the user through the input/output apparatus 20. According to such a configuration, the user becomes able to measure distance in the real space by a simpler operation using the input/output apparatus 20 and the terminal apparatus 30, without measuring the distance by actually using a tool such as a ruler or a tape measure.

5. Modifications

Next, modifications of the information processing system according to an embodiment of the present disclosure will be described.

<6.1. Modification 1: Measurement of Length of Curve>

Figure 17:
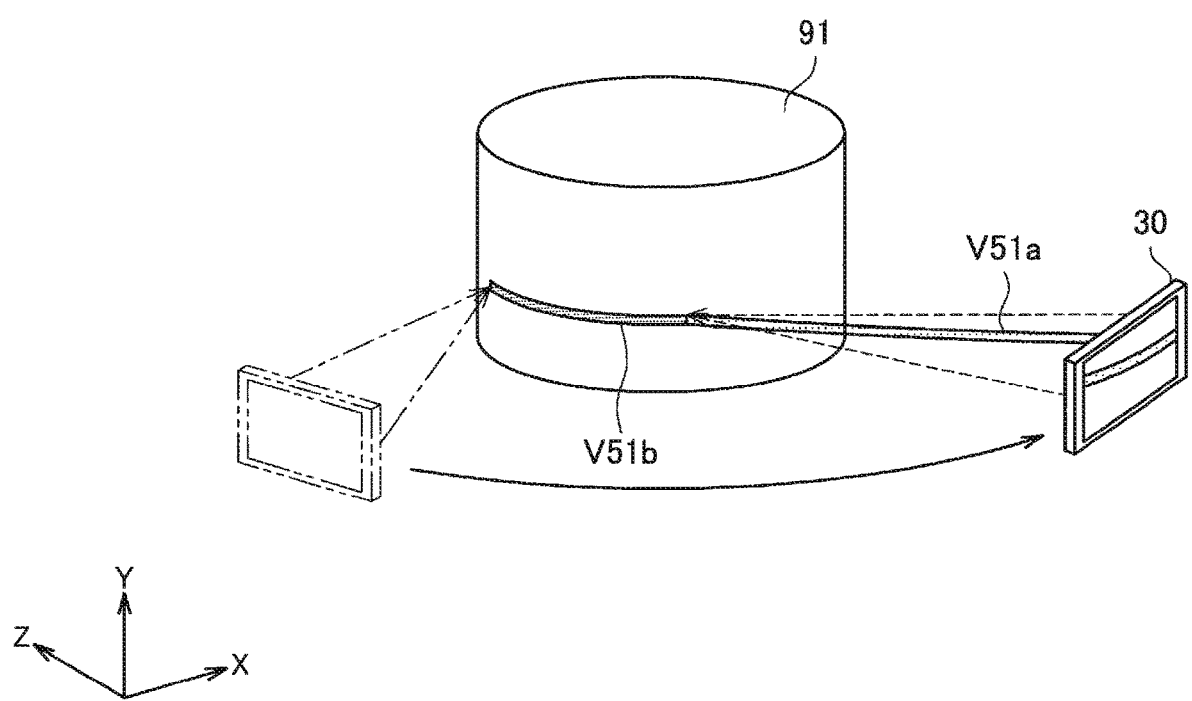
FIG. 17 is an explanatory diagram for describing an overview of an information processing system according to Modification 1.

First, an information processing system according to Modification 1 will be described. Each embodiment described earlier describes an example of a case of specifying reference points, such as a start point, end point, and the like to measure the distance (that is, the linear distance) between the multiple reference points. On the other hand, the information processing system according to Modification 1 is not limited to linear distance, and is configured to be capable of measuring the length of a curve, such as a distance on a curved surface. For example, FIG. 17 is an explanatory diagram for describing an overview of the information processing system according to Modification 1. Note that in FIG. 17, to make the features of the information processing system according to Modification 1 easier to understand, both a real object and a virtual object are presented together.

Specifically, in the information processing system according to Modification 1, the user specifies a path (trail) whose distance is to be measured through the input/output apparatus 20 or the terminal apparatus 30.

For example, in the example illustrated in FIG. 17, like in the case of measuring distance by winding what is called a tape measure around a body, the user sets a path (trail) whose distance is to be measured in the real space by placing a virtual object V51 on the surface of a real object 91 by an operation through the terminal apparatus 30. At this time, for example, the system determines whether or not an unplaced portion V51a of the virtual object V51 touches the real object 91, according to the positional relationship between the terminal apparatus 30 and the real object 91. Note that it is sufficient for the system to recognize the positional relationship in the real space between the virtual object V51 and the real object 91 according to an estimation result of the position and the attitude of the terminal apparatus 30 based on localization technology such as SLAM, for example. Additionally, the system may also recognize the portion determined to be touching the real object 91 among the portion V51a of the virtual object V51 as a portion V51b set as the path whose distance is to be measured.

Also, as another example, the user may also set the path whose distance is to be measured in a similar manner as the case of specifying a position in the real space in each embodiment described earlier, for example. As a more specific example, the user may move one's line of sight while wearing the input/output apparatus 20, and by tracing a path (trail) in the real space with the position that the line of sight is pointing to (that is, the gaze point), specify the path as the target of distance measurement. In this case, for example, it is sufficient for the system to detect changes in the user's line of sight, and recognize the trail corresponding to the changes in the gaze point that the line of sight is pointing to as the path whose distance is to be measured.

In this way, the system recognizes a path (trail) specified by the user through the input/output apparatus 20 and the terminal apparatus 30, and measures the distance of the path. According to such a configuration, the information processing system according to Modification 1 is not limited to linear distance, and also becomes capable of measuring the distance along a curved trail. Note that regarding the method of measuring the length of a curve, since generally known techniques are applicable, a detailed description will be omitted.

The above references FIG. 17 to describe the information processing system according to Modification 1.

<6.2. Modification 2: Example of Measurement Method Based on Operation of Virtual Object>

Figure 18:
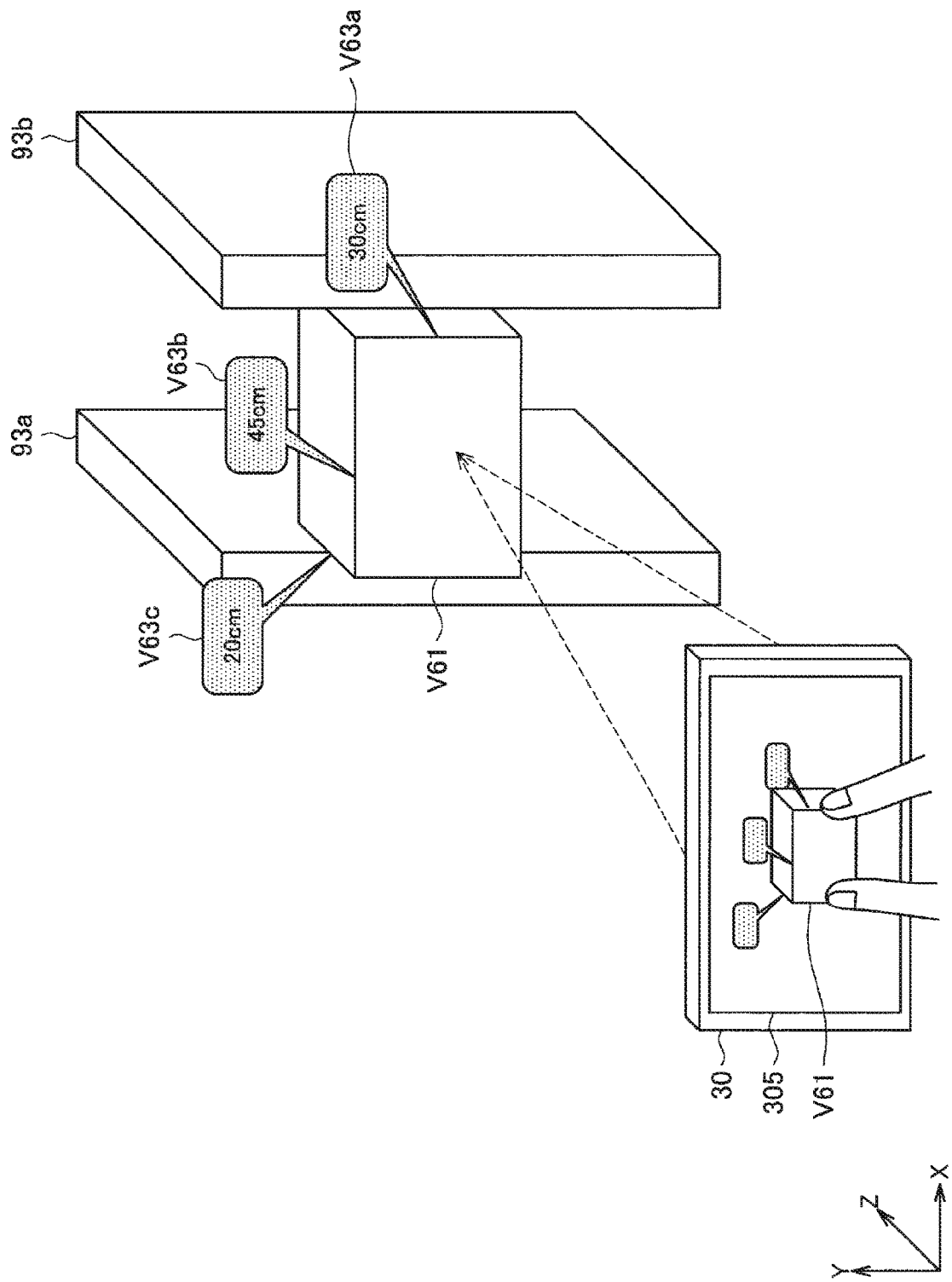
FIG. 18 is an explanatory diagram for describing an overview of an information processing system according to Modification 2.

Next, an information processing system according to Modification 2 will be described. In each embodiment and the modification described above, the distance between multiple reference points specified through the input/output apparatus 20 and the terminal apparatus 30 or the distance along a specified trail is measured. In contrast, Modification 2 describes an example of a procedure that measures a distance in the real space on the basis of a procedure different from each embodiment and the modification described above, and control for achieving such a procedure. For example, FIG. 18 is an explanatory diagram for describing an overview of the information processing system according to Modification 2. Note that in FIG. 18, to make the features of the information processing system according to Modification 2 easier to understand, both a real object and a virtual object are presented together.

Specifically, in the information processing system according to Modification 2, the user executes the measurement of a distance in the real space by adjusting, by an operation through the input/output apparatus 20 and the terminal apparatus 30, the size of a virtual object presented superimposed in the real space by the system.

For example, FIG. 18 illustrates an example of a case of measuring the distance between a real object 93a and a real object 93b. Specifically, in the example illustrated in FIG. 18, the system receives a predetermined operation from the user, and presents to the user a cuboid virtual object V61 through the output section 305 of the terminal apparatus 30, such that the virtual object V61 is superimposed onto a desired position in the real space.

Also, the system presents, in association with the virtual object V61, display information V63 indicating the size (length) of a predetermined portion of the presented virtual V61. For example, in the example illustrated in FIG. 18, the system presents display information V64*a*, V63*b*, and V63*c* indicating the length of each of the length, width, and depth of the cuboid virtual object V61. Note that it is sufficient for the system to recognize the position in the real space where the virtual object V61 is superimposed and the size in the real space of the virtual object V61 according to an estimation result of the position and the attitude of the terminal apparatus 30 based on localization technology such as SLAM, for example.

Based on such a configuration, the user is able to execute the measurement of a distance by adjusting the position in the real space where the presented virtual object V61 is superimposed and the size of each part of the virtual object V61 (such as the length, width, and depth, for example) by an operation through the input section 303 (such as a touch panel, for example) of the terminal apparatus 30. For example, in the example illustrated in FIG. 18, the user adjusts the position and the width of the virtual object V61 such that the width of the virtual object V61 just fits between the real objects V93*a* and V93*b*. According to such a procedure, the user becomes able to measure the distance between the real object 93*a* and the real object 93*b* as the size of the width of the virtual object V61, and recognize the measurement result by the display information V63*b*.

Also, as another example, the user may also adjust the size of each part of the cuboid virtual object V61, such that a target real object is contained inside the virtual object V61. According to such an operation, for example, it also becomes possible to measure the size of a box containing a body (that is, a real object) which is not square, such as a stuffed toy or bag.

The above references FIG. 18 to describe the information processing system according to Modification 2.

<6.3. Modification 3: Example of Case of Linking Multiple Apparatus>

Figure 19:
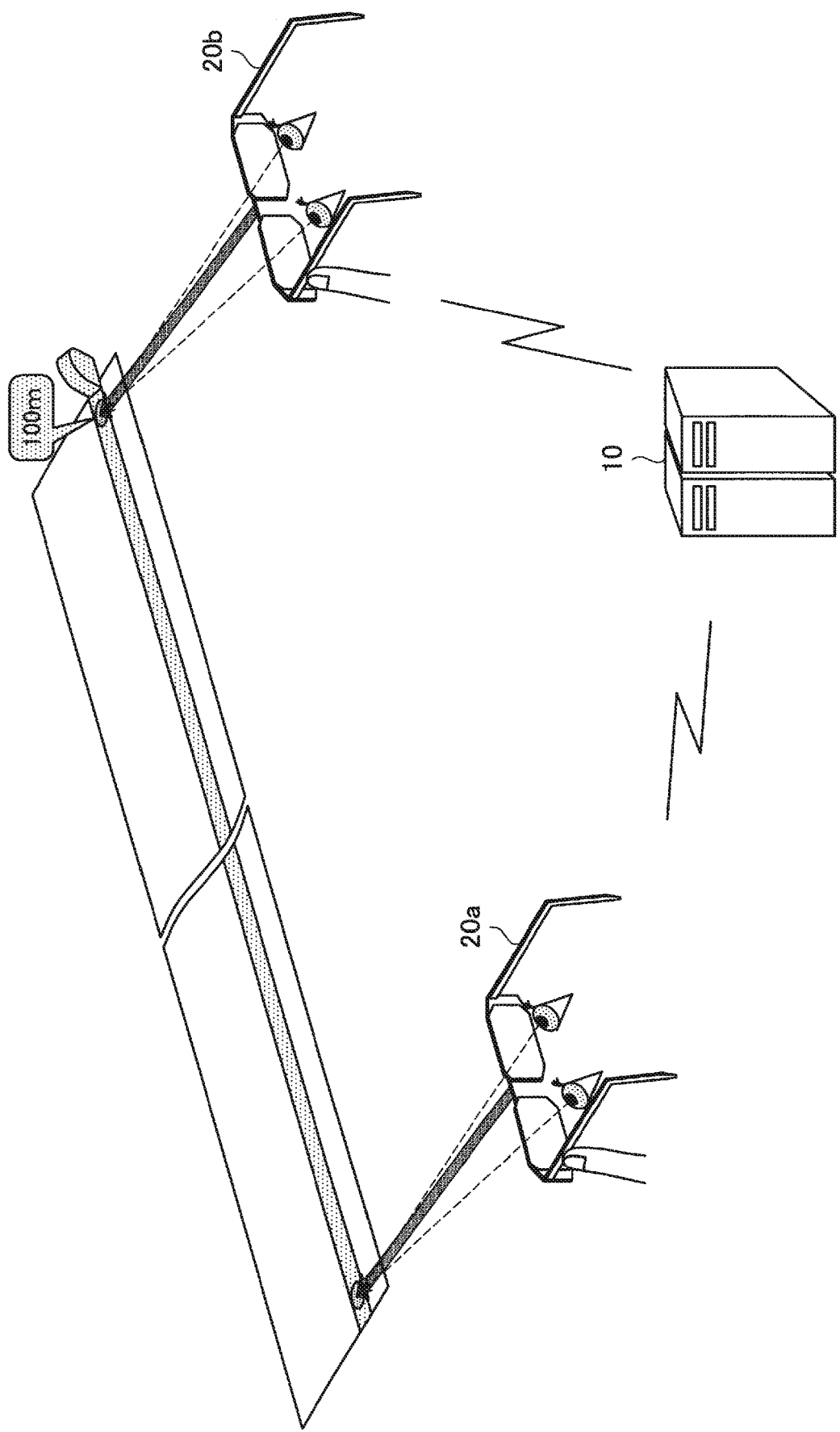
FIG. 19 is an explanatory diagram for describing an overview of an information processing system according to Modification 3.

Next, an information processing system according to Modification 3 will be described. Modification 3 describes an example of the configuration and control in a case of measuring the distance between multiple more distant positions in the real space by linking multiple apparatus such as the input/output apparatus 20, the terminal apparatus 30, or the like. For example, FIG. 19 is an explanatory diagram for describing an overview of the information processing system according to Modification 3. Note that in FIG. 19, to make the features of the information processing system according to Modification 3 easier to understand, both a real object and a virtual object are presented together.

In the example illustrated in FIG. 19, input/output apparatus 20*a* and 20*b* and an information processing apparatus 10 operate in a linked manner. The information processing apparatus 10 is configured to be capable of transmitting and receiving information through a predetermined communication path (such as a wireless communication path, for example) with each of the input/output apparatus 20*a* and 20*b*. Based on such a configuration, for example, the start point of a measurement of a distance is specified by an operation through the input/output apparatus 20*a*, while the end point is specified by an operation through the input/output apparatus 20*b*.

At this time, the information processing apparatus 10 recognizes the positional relationship between the input/output apparatus 20*a* and 20*b* on the basis of, for example, a result of localization by each of the input/output apparatus 20*a* and 20*b*, or a positioning result of the position of each of the input/output apparatus 20*a* and 20*b* according to a positioning system such as the Global Positioning System (GPS) or the like. With this arrangement, on the basis of the recognition result of the positional relationship between the input/output apparatus 20*a* and 20*b*, the information processing apparatus 10 becomes able to recognize the positional relationship in the real space between the start point specified through the input/output apparatus 20*a* and the end point specified through the input/output apparatus 20*b*.

Subsequently, it is sufficient for the information processing apparatus 10 to measure the distance between the start point and the end point according to the recognition result of the positional relationship in the real space between the start point and the end point. Also, at this time, the information processing apparatus 10 may present display information corresponding to the distance measurement result to the user through the input/output apparatus 20*a* and the input/output apparatus 20*b*.

Note that the configuration illustrated in FIG. 19 is merely one example, and insofar as the functions described above can be realized, the configuration of the information processing system according to Modification 3 is not necessarily limited to the example illustrated in FIG. 19. As a specific example, the functions handled by the information processing apparatus 10 may also be handled by either of the input/output apparatus 20*a* and 20*b*. Also, as another example, the input/output apparatus 20*a* and the input/output apparatus 20*b* may exchange information with each other and thereby recognize the positional relationship with each other in the real space, and each may execute a process related to the distance measurement independently.

The above references FIG. 19 to describe the information processing system according to Modification 3.

7. Application Examples

Next, application examples of the information processing system according to each embodiment of the present disclosure will be described.

(Selective Switching of Measurement Method)

As described above, each measurement method described as each embodiment and each modification uses different apparatus and procedures. For this reason, the system may also be configured such that at least some of the measurement methods described above are usable selectively depending on the situation.

As a more specific example, in cases such as when the user and the target of measurement are apart from each other, the measurement method described as the first embodiment (see FIG. 2) is better suited to a situation of the measuring the size of the target (a distance or the like). Also, the measurement method described as the second embodiment (see FIG. 6) is better suited to a situation in which the user is able to approach the measurement target. Also, the measurement method described as the third embodiment (see FIGS. 10 and 11) is better suited to a situation in which the user is able to make the input/output apparatus 20 or the terminal apparatus 30 touch or approach the measurement target. For this reason, such differences of situation may be anticipated, and the system may be configured to set a mode (such as a "long-range mode", and "short-range mode", and the like) corresponding to each measurement method, and in accordance with the mode specified by the user, selectively execute each measurement method described above.

Also, modes for selectively executing each measurement method may also be set in accordance with differences of procedure in each measurement method. As a specific example, the measurement method described as the first embodiment (see FIG. 2) is capable of executing the measurement of a distance on the basis of a simpler procedure, but is capable of registering only a position on the surface of a real object as a reference point. In contrast, the measurement method described as the second embodiment (see FIG. 6) has more steps compared to the first embodiment, but is also capable of registering a point in the real space where a real object does not exist as a reference point. For this reason, for example, the system may present the measurement method described as the first embodiment as a "simple mode", and present another measurement method (for example, the measurement method described as the second embodiment) as an "advanced mode".

(Example of Method of Specifying Reference Point)

Also, the method of setting a reference point, such as a start point, end point, or the like, is not limited to the examples illustrated in each measurement procedure described above, and may also be switched appropriately depending on the situation. As a specific example, a reference point may also be registered automatically by utilizing what is called body recognition based on image analysis, such as face recognition, hand recognition, foot recognition, or the like.

As a more specific example, the information processing system according to an embodiment of the present disclosure may also be utilized for the measurement of jump distance in the long jump, for example. In this case, for example, by capturing an image of an athlete jumping with the imaging section of the input/output apparatus 20, and performing image analysis on the image, the system recognizes the movements associated with the jumping and landing of the jumping athlete. Subsequently, in the case of recognizing the landing of the jumping athlete, it is sufficient for the system to recognize the feet of the athlete at the time of landing, and recognize the position of the feet as the landing point. With this arrangement, for example, by treating the position of the takeoff as the start point, treating the recognized landing point as the end point, and measuring the distance, the system also becomes capable of executing the measurement of the jump distance in the long jump.

(Presentation of Various Information Utilizing Distance Measurement Result)

Also, the measurement result of a distance in the real space may also be utilized in the presentation of various information. For example, FIGS. 20 and 21 are explanatory diagrams for explaining an example of a method of presenting various information utilizing the measurement result of a distance in the real space, and illustrate an example of presenting a representation of the placement of a tent and the like according to the distance measurement result when camping.

Figure 20:
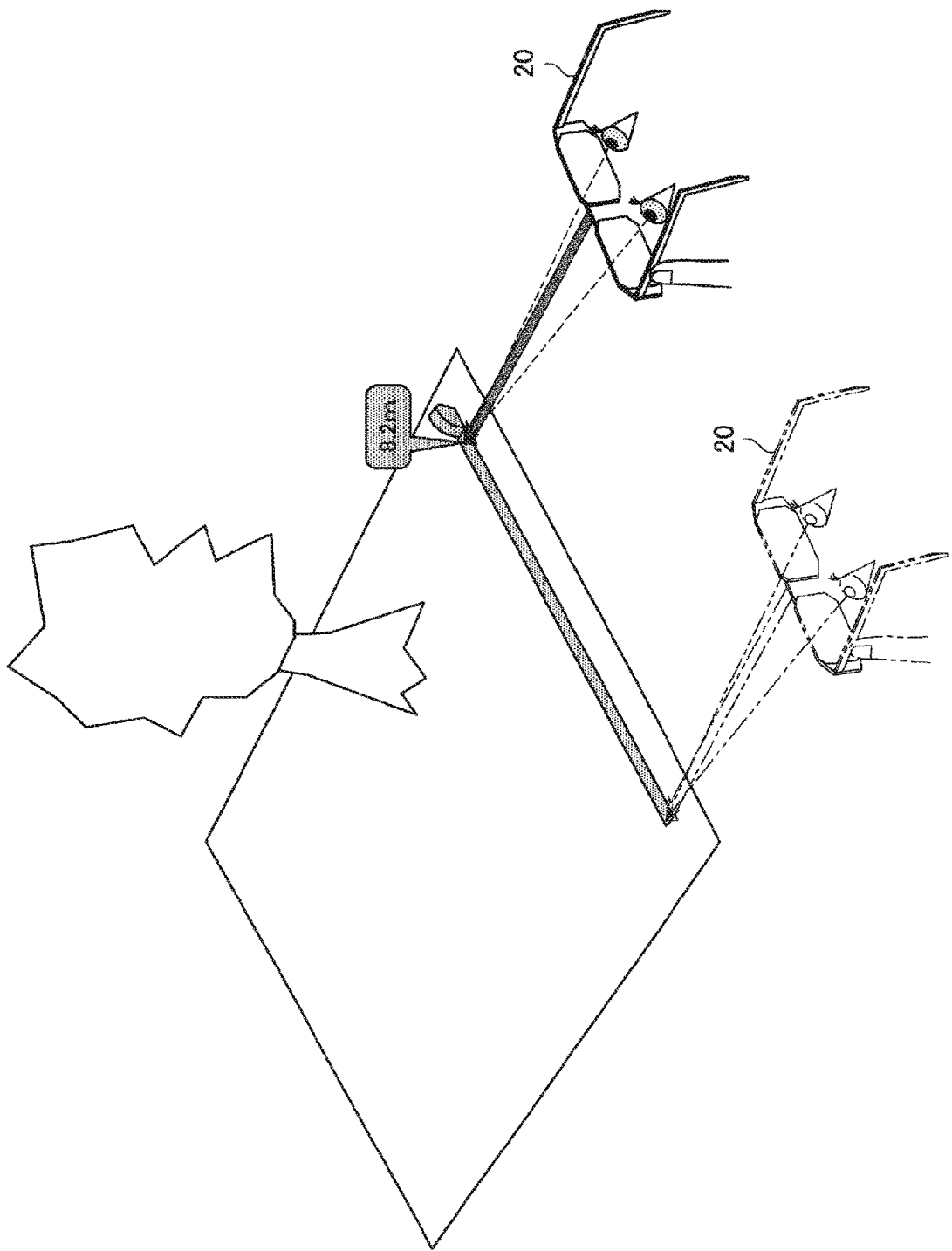
FIG. 20 is an explanatory diagram for explaining an example of a method of presenting various information utilizing a measurement result of a distance in a real space.
Figure 21:
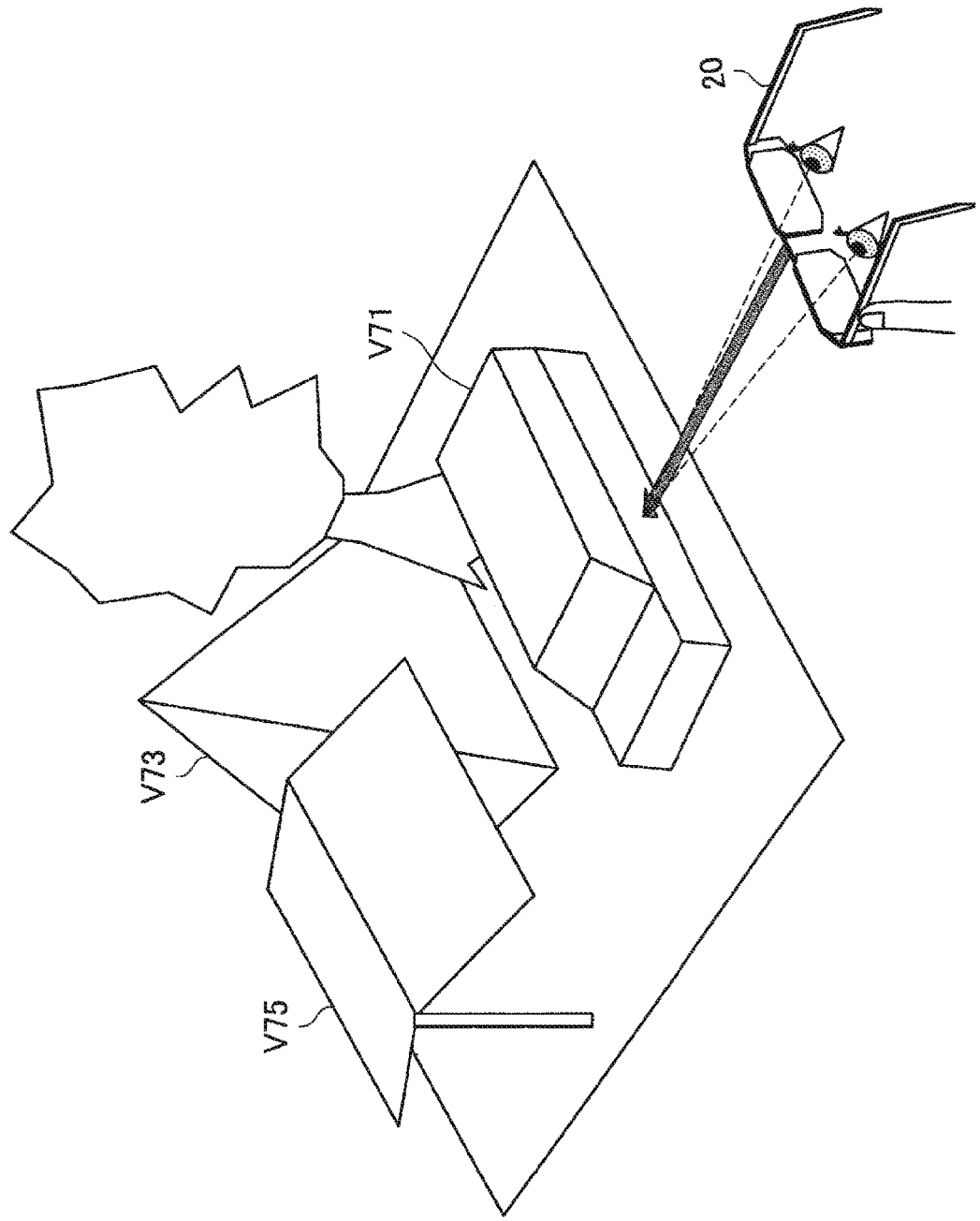
FIG. 21 is an explanatory diagram for explaining an example of a method of presenting various information utilizing a measurement result of a distance in a real space.

Specifically, first, as illustrated in FIG. 20, the user uses the input/output apparatus 20 to thereby measure the dimensions of an area in which to set up a tent and the like, on the basis of the various measurement methods described above. At this time, the system estimates the position and the attitude of the input/output apparatus 20 in the real space on the basis of localization technology such as SLAM, and recognizes the position and dimensions in the real space of the area specified by the user on the basis of the estimation result.

Also, the system stores in advance information indicating the shapes and sizes of bodies to be placed, such as a tent and the like. Additionally, on the basis of the information indicating the shapes and sizes of the bodies, and the recognition result of the position and dimensions in the real space of the area specified by the user, the system presents virtual objects V71 to V73 imitating the bodies such as a tent and the like, superimposed onto the area at the sizes in the real space. Based on such a configuration, for example, as illustrated in FIG. 21, the system presents a representation of the placement of bodies, such as a tent and the like, in the area specified by the user as the virtual objects V71 to V73 superimposed onto the real space. With this arrangement, for example, the user also becomes able to recognize a more suitable position in the real space for hammering tent stakes and the like, on the basis of a placement representation as illustrated in FIG. 21.

In addition, the scene in which the mechanism described above with reference to FIGS. 20 and 21 is used is not limited to only the usage example when camping described above. For example, by utilizing a measurement result of the dimensions of a room, it also becomes possible to present a representation of furniture arrangement. Also, as another example, by using a measurement result of the dimensions inside a suitcase, it is also possible to present a representation of the storage of things contained inside the suitcase. Also, as another example, by using a measurement result of the size of body parts such as the arms and legs, a representation of the case of wearing clothing may also be presented.

(Application to Measurement of Area and Volume)

Also, although the above describes the measurement of a one-dimensional size such as distance or the like, it is also possible to execute the measurement of a two-dimensional size, such as area, or the measurement of a three-dimensional size, such as volume.

Figure 22:
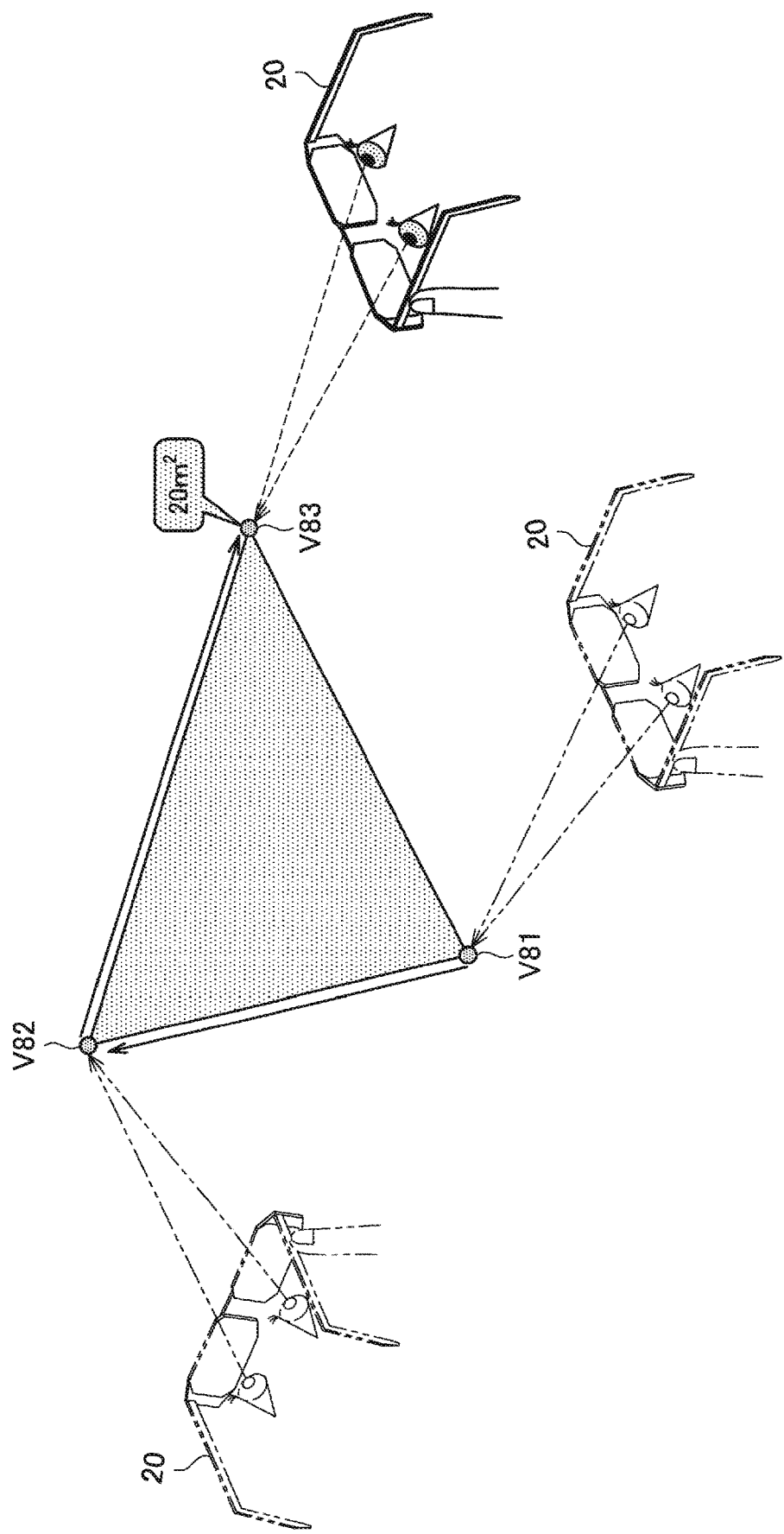
FIG. 22 illustrates an example of a measurement procedure in a case of measuring area.

For example, FIG. 22 illustrates an example of a measurement procedure in a case of measuring area. In the example illustrated in FIG. 22, the system registers three or more reference points on the basis of specifications from the user through the input/output apparatus 20 or the terminal apparatus 30, and measures the area of the region enclosed by the three or more reference points.

Specifically, on the basis of operations through the input/output apparatus 20, the user successively registers the reference points illustrated by the reference signs V81 to V83. At this time, for example, on the basis of an estimation result of the position and the attitude in the real space of the input/output apparatus 20, the system recognizes the position in the real space of each of the registered reference points V81 to V83. Additionally, it is sufficient for the system to compute the area of the region enclosed by the reference points V81 to V83 on the basis of the recognized position in the real segment of each of the reference points V81 to V83. Also, at this time, the system may present display information indicating the computation result of the area to the user through the input/output apparatus 20.

Figure 23:
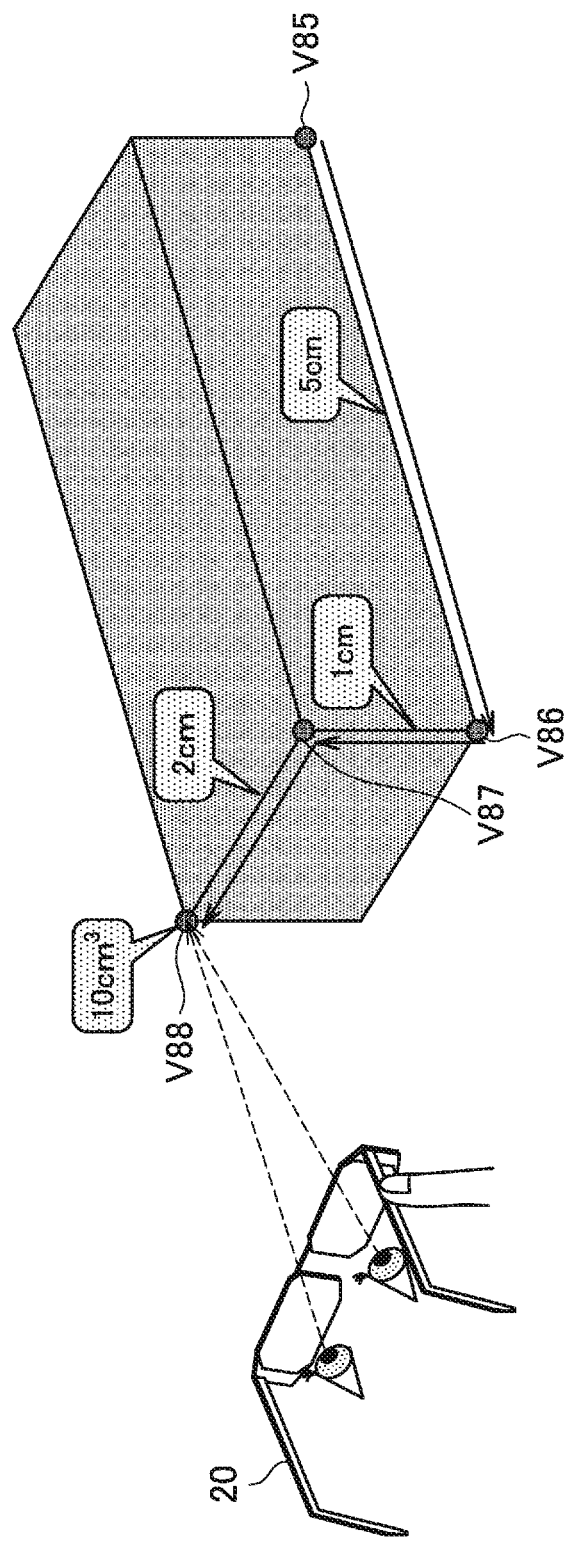
FIG. 23 illustrates an example of a measurement procedure in a case of measuring volume.

Also, FIG. 23 illustrates an example of a measurement procedure in a case of measuring volume. For example, the system registers four or more reference points on the basis of specifications from the user through the input/output apparatus 20 or the terminal apparatus 30, and measures the volume of the three-dimensional region formed on the basis of edges connecting each of the four or more reference points.

Specifically, FIG. 23 illustrates an example of the case of measuring the volume of a real object having a cuboid shape. In the example illustrated in FIG. 23, on the basis of operations through the input/output apparatus 20, the input/output apparatus 20 successively specifies the reference points illustrated by the reference signs V84 to V88, and thereby registers the three edges of length, width, and depth of the target real object. At this time, for example, on the basis of an estimation result of the position and the attitude in the real space of the input/output apparatus 20, the system recognizes the position in the real space of each of the registered reference points V84 to V88. Also, on the basis of the recognition result of the position of each of the reference points V84 to V88, the system computes the length of each of the length, width, and depth of the real object to be measured. Subsequently, it is sufficient for the system to compute the volume of the real object on the basis of the computation result of the length of each of the length, width, and depth of the real object to be measured. Also, at this time, the system may present the computation result of the length of each of the length, width, and depth of the real object to be measured, and display information indicating the computation result of the volume, to the user through the input/output apparatus 20.

The above describes application examples of the information processing system according to each embodiment of the present disclosure. Note that the examples described above are merely one example, and do not limit the range of application of the information processing system according to each embodiment of the present disclosure. As a specific example, the information processing system according to each embodiment of the present disclosure may also be used to measure lengths at a work site or the like, for example.

8. Exemplary Hardware Configuration

Figure 24:
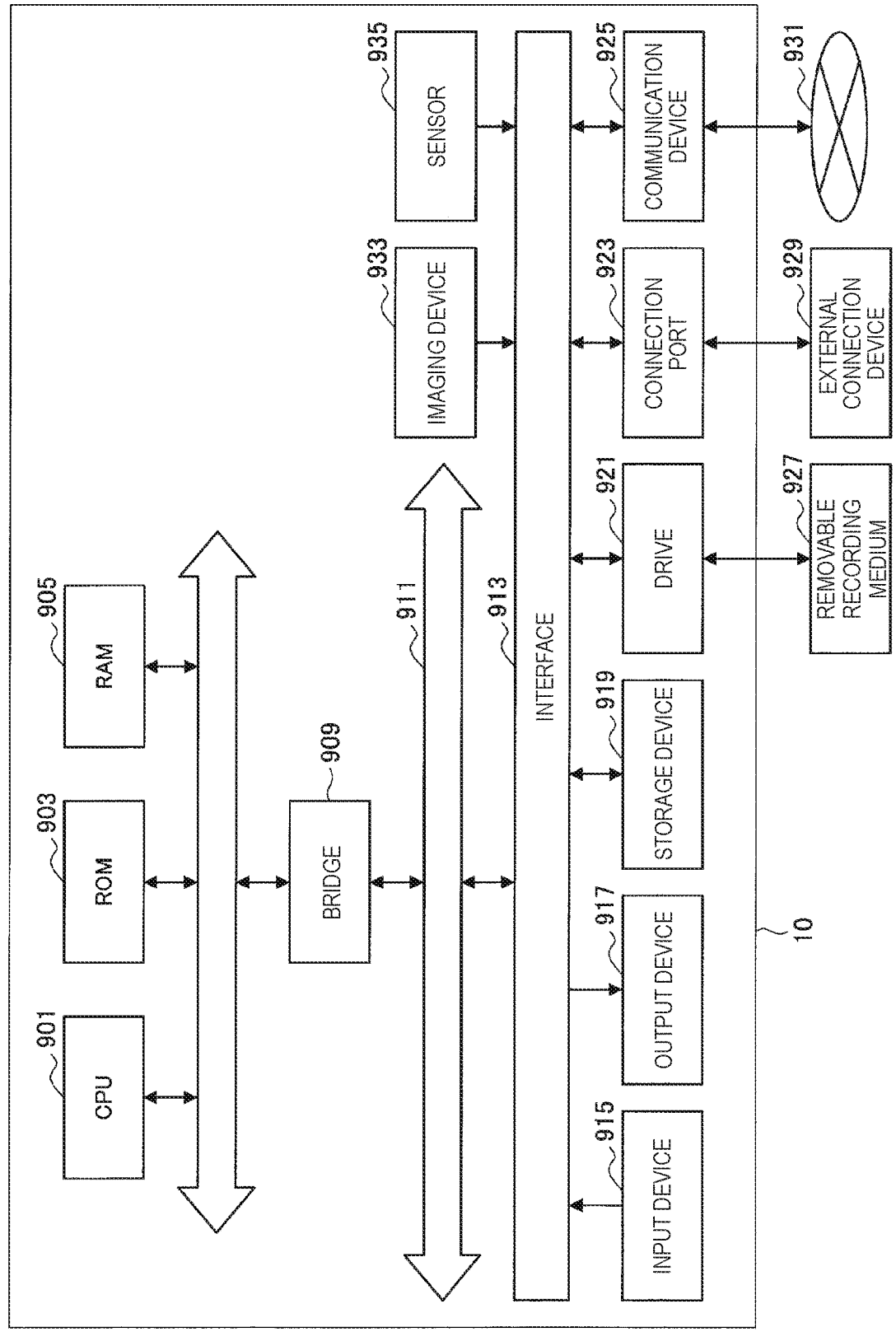
FIG. 24 is a block diagram illustrating an exemplary hardware configuration of an information processing apparatus according to an embodiment of the present disclosure.

Next, FIG. 24 will be referenced to describe an example of a hardware configuration of the information processing apparatus 10, 40, and 50, as well as what may be called an information processing apparatus like the terminal apparatus 30, according to an embodiment of the present disclosure. Note that this description will focus on the information processing apparatus 10. For example, FIG. 24 is a block diagram illustrating an exemplary hardware configuration of the information processing apparatus 10 according to an embodiment of the present disclosure.

As illustrated in FIG. 24, the information processing apparatus 10 includes a central processing unit (CPU) 901, a read only memory (ROM) 903, and a random access memory (RAM) 905. In addition, the information processing apparatus 10 may include a host bus 907, a bridge 909, an external bus 911, an interface 913, an input device 915, an output device 917, a storage device 919, a drive 921, a connection port 923, and a communication device 925. Further, the information processing apparatus 100 may include an imaging device 933 and a sensor 935 as necessary. The information processing apparatus 10 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the information processing apparatus 10 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909. Note that the depth detection section 101, the position and attitude estimation section 103, the line of sight detection section 105, the gaze point detection section 107, the trigger detection section 109, the reference point estimation section 111, the distance computation section 113, the output control section 115, and the like described earlier may be realized by the CPU 901, for example.

The input device 915 is, for example, a device operated by a user with a mouse, a keyboard, a touch panel, buttons, switches, a lever, and the like. The input device 915 may include a mic that detects a sound of a user. The input device 915 may be, for example, a remote control unit using infrared light or other radio waves, or may be an external connection device 929 such as a portable phone operable in response to the operation of the information processing apparatus 10. The input device 915 includes an input control circuit that generates an input signal on the basis of the information input by a user and outputs the input signal to the CPU 901. By operating the input device 915, a user can input various types of data to the information processing apparatus 10 or issue instructions for causing the information processing apparatus 10 to perform a processing operation. For example, the operating section 207, the sound collection section 209, and the like described earlier may be realized by the input device 915, for example. In addition, the imaging device 933 to be described below can function as an input device by imaging a motion or the like of a hand of the user.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the information processing apparatus 10 in a form of video such as text or an image, and outputs voice or sound. In addition, the output device 917 may include a light or the like to brighten the surroundings. Note that, the above-described output unit 211 may be implemented by the output device 917, for example.

The storage device 919 is a device for data storage configured as an example of a storage unit of the information processing apparatus 10. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 10 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the information processing apparatus 10. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection device 929 to the connection port 923, various data may be exchanged between the information processing apparatus 10 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging device 933 may be a device that captures still images and may also be a device that captures moving images. Note that, the above-described the first imaging section 201 and the second imaging section 203 may be implemented by the imaging device 933, for example.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 10, such as the attitude of the case of the information processing apparatus 10, as well as information regarding the environment surrounding the information processing apparatus 10, such as brightness or noise surrounding the information processing apparatus 10, for example. The sensor 935 may also include a global positioning system (GPS) sensor that receives GPS signals and measures the latitude, longitude, and altitude of the device.

The foregoing thus illustrates an exemplary hardware configuration of the information processing apparatus 10. Each of the above components may be realized with general-purpose members or hardware specialized in the function of each component. Such a configuration may also be modified as appropriate in accordance with the technological level at the time of the implementation.

Further, it is also possible to create a program for causing hardware such as a processor, a memory, and a storage incorporated into a computer to exert a function equivalent to the structural elements included in the above-described information processing apparatus 10. In addition, it is also possible to provide a computer readable storage medium in which the program is recorded.

9. Conclusion

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquisition section that acquires an image captured by a predetermined imaging section, and position information based on at least any of a position and a direction of the imaging section;

an estimation section that estimates a first position and a second position in a real space, on a basis of a first image and a second image which are the image captured at each of a first viewpoint and a second viewpoint, and first position information and second position information which are the position information about each of the first viewpoint and the second viewpoint; and a measurement section that measures a distance between the first position and the second position on a basis of the estimation result.

(2)

The information processing apparatus according to (1), including:

a detection section that detects a line of sight of a user, in which the estimation section estimates the first position on a basis of the detection result of the line-of-sight at the first viewpoint, the first image, and the first position information, and estimates the second position on a basis of the detection result of the line-of-sight at the second viewpoint, the second image, and the second position information.

(3)

The information processing apparatus according to (2), in which the estimation section estimates the first position on a basis of a specification by the line of sight from the first viewpoint, and estimates the second position on a basis of a specification by the line of sight from the second viewpoint.

(4)

The information processing apparatus according to (2), including:

a display control section that causes a predetermined display section to display a virtual object in accordance with the detection result of the line of sight, in which the estimation section estimates the first position on a basis of a specification by the virtual object displayed in accordance with the line of sight from the first viewpoint, and estimates the second position on a basis of a specification by the virtual object displayed in accordance with the line of sight from the second viewpoint.

(5)

The information processing apparatus according to (1), in which the estimation section estimates at least any of the first position and the second position on a basis of a specification corresponding to a detection result of touch or approach with respect to a real object in a real space by a predetermined detection section.

(6)

The information processing apparatus according to (1), including:

a display control section that causes a predetermined display section to display a virtual object in accordance with a recognition result of a real object in the real space, in which the estimation section estimates at least any of the first position and the second position on a basis of a specification by the virtual object.

(7)

The information processing apparatus according to (1), in which the estimation section estimates at least any of the first position and the second position on a basis of a specification corresponding to a recognition result of a body in the real space.

(8)

The information processing apparatus according to (1), including:

a display control section that causes a predetermined display section to display display information on a basis of the measurement result of the distance.

(9)

The information processing apparatus according to (8), in which the display control section causes the display information indicating the measurement result of the distance to be displayed.

(10)

The information processing apparatus according to (8) or (9), in which the display control section causes the display information indicating a scale in the real space to be displayed, on a basis of the measurement result of the distance.

(11)

The information processing apparatus according to any one of (8) to (10), in which the display control section causes the display information to be displayed at a size corresponding to the measurement result of the distance.

(12)

The information processing apparatus according to any one of (1) to (11), in which the measurement section measures a distance of a path between the first position and the section position, the path going through a third position specified between the first position and the second position.

(13)

The information processing apparatus according to any one of (1) to (11), in which the measurement section measures a length of a trail specified between the first position and the second position as the distance.

(14)

The information processing apparatus according to any one of (1) to (13), in which the acquisition section acquires a set of the first image and the first position information and a set of the second image and the second position information from different external apparatus.

(15)

An information processing method including:

acquiring an image captured by a predetermined imaging section, and position information based on at least any of a position and a direction of the imaging section;

estimating, by a processor, a first position and a second position in a real space, on a basis of a first image and a second image which are the image captured at each of a first viewpoint and a second viewpoint, and first position information and second position information which are the position information about each of the first viewpoint and the second viewpoint; and measuring, by the processor, a distance between the first position and the second position on a basis of the estimation result.

(16)

A recording medium storing a program causing a computer to execute:

acquiring an image captured by a predetermined imaging section, and position information based on at least any of a position and a direction of the imaging section;

estimating a first position and a second position in a real space, on a basis of a first image and a second image which are the image captured at each of a first viewpoint and a second viewpoint, and first position information and second position information which are the position information about each of the first viewpoint and the second viewpoint; and measuring a distance between the first position and the second position on a basis of the estimation result.

REFERENCE SIGNS LIST 1, 2, 3 information processing system
10 information processing apparatus
101 depth detection section
103 position and attitude estimation section
105 line of sight detection section
107 gaze point detection section
109 trigger detection section
111 reference point estimation section
113 distance computation section
115 output control section
20 input/output apparatus
201 first imaging section
203 second imaging section
205 input section
207 operating section
209 sound collection section
30 terminal apparatus
301 imaging section
303 input section
305 output section
40 information processing apparatus
401 depth detection section
403 position and attitude estimation section
405 trigger detection section
407 reference point estimation section
409 distance computation section
411 output control section
50 information processing apparatus
501 depth detection section
503 position and attitude estimation section
505 body recognition section
507 trigger detection section
509 reference point estimation section
511 distance computation section
513 output control section

The invention claimed is:

1. An information processing apparatus comprising:
an acquisition section that acquires an image captured by a predetermined imaging section, and position information based on at least any of a position and a direction of the imaging section;
an estimation section that estimates a first position and a second position in a real space, on a basis of a first image and a second image which are the image captured at each of a first viewpoint and a second viewpoint, and first position information and second position information which are the position information about each of the first viewpoint and the second viewpoint, wherein the first viewpoint and the second viewpoint are associated with at least one of different respective orientations of the imaging section or different respective positions of the imaging section, the first image is captured at the first viewpoint prior to a movement of the imaging section, and the second image is captured at the second viewpoint after the movement of the imaging section;
a measurement section that measures a distance between the first position and the second position on a basis of the estimation result; and
a display control section that causes a predetermined display section to display, in real-time as a location of the second position is changed in the real space based on adjustment of the orientation or position of the imaging section associated with the second viewpoint, display information indicating a measurement result of the distance,
wherein the acquisition section, the imaging section, the estimation section, the measurement section, and the display control section are each implemented via at least one processor.

2. The information processing apparatus according to claim 1, further comprising:
a detection section that detects a line of sight of a user, wherein
the estimation section
estimates the first position on a basis of the detection result of the line-of-sight at the first viewpoint, the first image, and the first position information, and
estimates the second position on a basis of the detection result of the line-of-sight at the second viewpoint, the second image, and the second position information, and
wherein the detection section is implemented via at least one processor.

3. The information processing apparatus according to claim 2, wherein
the estimation section
estimates the first position on a basis of a specification by the line of sight from the first viewpoint, and
estimates the second position on a basis of a specification by the line of sight from the second viewpoint.

4. The information processing apparatus according to claim 2, further comprising:
a display control section that causes a predetermined display section to display a virtual object in accordance with the detection result of the line of sight, wherein
the estimation section
estimates the first position further on a basis of a specification by the virtual object displayed in accordance with the line of sight from the first viewpoint, and
estimates the second position further on a basis of a specification by the virtual object displayed in accordance with the line of sight from the second viewpoint, and
wherein the display control section is implemented via at least one processor.

5. The information processing apparatus according to claim 1, wherein
the estimation section estimates at least any of the first position and the second position further on a basis of a specification corresponding to a detection result of touch or approach with respect to a real object in a real space by a predetermined detection section.

6. The information processing apparatus according to claim 1, further comprising:
a display control section that causes a predetermined display section to display a virtual object in accordance with a recognition result of a real object in the real space, wherein
the estimation section estimates at least any of the first position and the second position further on a basis of a specification by the virtual object, and
wherein the display control section is implemented via at least one processor.

7. The information processing apparatus according to claim 1, wherein
the estimation section estimates at least any of the first position and the second position further on a basis of a specification corresponding to a recognition result of a body in the real space.

8. The information processing apparatus according to claim 1, wherein
the display control section causes the display information indicating a scale in the real space to be displayed, on a basis of the measurement result of the distance.

9. The information processing apparatus according to claim 1, wherein
the display control section causes the display information to be displayed at a size corresponding to the measurement result of the distance.

10. The information processing apparatus according to claim 1, wherein
the measurement section measures a distance of a path between the first position and the section position, the path going through a third position specified between the first position and the second position.

11. The information processing apparatus according to claim 1, wherein
the measurement section measures a length of a trail specified between the first position and the second position as the distance.

12. The information processing apparatus according to claim 1, wherein
the acquisition section acquires a set of the first image and the first position information and a set of the second image and the second position information from different external apparatus.

13. The information processing apparatus according to claim 1, wherein the first viewpoint and the second viewpoint are associated with different orientations of the imaging section and different positions of the imaging section.

14. An information processing method comprising:
acquiring an image captured by a predetermined imaging section, and position information based on at least any of a position and a direction of the imaging section;
estimating, by a processor, a first position and a second position in a real space, on a basis of a first image and a second image which are the image captured at each of a first viewpoint and a second viewpoint, and first position information and second position information which are the position information about each of the first viewpoint and the second viewpoint, wherein the first viewpoint and the second viewpoint are associated with at least one of different respective orientations of the imaging section or different respective positions of the imaging section, the first image is captured at the first viewpoint prior to a movement of the imaging section, and the second image is captured at the second viewpoint after the movement of the imaging section;

measuring, by the processor, a distance between the first position and the second position on a basis of the estimation result; and displaying, in real-time as a location of the second position is changed in the real space based on adjustment of the orientation or position of the imaging section associated with the second viewpoint, display information indicating a measurement result of the distance.

15. A non-transitory computer-readable recording medium having stored thereon a program, which when executed by a computer causes the computer to execute a method, the method comprising:

acquiring an image captured by a predetermined imaging section, and position information based on at least any of a position and a direction of the imaging section;

estimating a first position and a second position in a real space, on a basis of a first image and a second image which are the image captured at each of a first viewpoint and a second viewpoint, and first position information and second position information which are the position information about each of the first viewpoint and the second viewpoint, wherein the first viewpoint and the second viewpoint are associated with at least one of different respective orientations of the imaging section or different respective positions of the imaging section, the first image is captured at the first viewpoint prior to a movement of the imaging section, and the second image is captured at the second viewpoint after the movement of the imaging section;

measuring a distance between the first position and the second position on a basis of the estimation result; and displaying, in real-time as a location of the second position is changed in the real space based on adjustment of the orientation or position of the imaging section associated with the second viewpoint, display information indicating a measurement result of the distance.

\* \* \* \* \*